US006938051B1

(12) United States Patent
Burger et al.

(10) Patent No.: US 6,938,051 B1
(45) Date of Patent: Aug. 30, 2005

(54) METHOD, STORAGE MEDIUM AND SYSTEM FOR ELECTRONICALLY VIEWING MULTI-PAGE DOCUMENT WHILE PRESERVING APPEARANCE OF PRINTED PAGES

(75) Inventors: Robert T. Burger, Reston, VA (US); Randall Stafford, Littleton, CO (US); Richard E. Fletcher, Alexandria, VA (US); Timothy A. Kutz, Alexandria, VA (US); Bente Tonder Gendron, Falls Church, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/258,123

(22) Filed: Feb. 26, 1999

(51) Int. Cl.[7] .............................................. G06F 17/30

(52) U.S. Cl. .................... 707/104.1; 707/10; 707/101; 715/513; 705/40

(58) Field of Search .............................. 707/1, 10, 104, 707/513, 539, 500, 100, 526, 104.1, 101; 705/1, 34, 40; 715/526, 527, 911, 908, 525, 715/513

(56) References Cited

U.S. PATENT DOCUMENTS 4,160,242 A 7/1979 Fowler et al. .............. 345/169
4,757,302 A 7/1988 Hatakeyama et al. ..... 340/407.2
4,918,588 A * 4/1990 Barrett et al. ................. 707/10
5,241,472 A 8/1993 Gur et al. ................... 382/128
5,319,745 A 6/1994 Visonneau et al. ......... 707/515
5,339,412 A * 8/1994 Fueki ......................... 707/101
5,438,344 A 8/1995 Oliva ......................... 345/507
5,448,691 A 9/1995 Motoyama .................. 707/525
5,623,681 A 4/1997 Rivette et al. .............. 707/522
5,634,064 A * 5/1997 Warnock et al. ............ 715/513
5,689,648 A 11/1997 Diaz et al. ..................... 705/26
5,781,785 A 7/1998 Rowe et al. ................ 707/513
5,819,301 A * 10/1998 Rowe et al. ................ 707/513
5,893,908 A * 4/1999 Cullen et al. .................. 707/5

(Continued)

OTHER PUBLICATIONS

Antonacopoulos et al., Segmentation and Classification of Document Images, IEEE Colloquium on Document Image Processing and Multimedia Environments, Nov. 1995, p. 16/1-16/7.*

*Primary Examiner*—Greta Robinson
(74) *Attorney, Agent, or Firm*—Leonard C. Suchtya, Esq.; Joel Wall, Esq.; Rader, Fishman & Grauer

(57) ABSTRACT

An electronic Yellow Pages viewer shows the pages of a Yellow Pages directory as they appear in the bound version. The print queue used to print the bound version is intercepted, and each page is rasterized into a JPEG file or otherwise converted into an image file. The page/header/advertisement data are parsed to create an index which associates each Yellow Pages heading with the first page on which that heading appears. The viewer runs as a Java applet inside a World Wide Web browser and allows a user to access a page by typing the name of a heading, selecting the heading from a tree view or typing a page number. A Yellow Pages advertiser receives an electronic bill with an electronic tear sheet showing the page on which the advertisement appears. The bill can also include one or more of the reverse page, the opposite page, or other pages in the same heading. The advertisement can be selectively highlighted.

58 Claims, 19 Drawing Sheets

U.S. PATENT DOCUMENTS 5,907,835 A * 5/1999 Yokomizo et al. ............ 707/1
5,930,474 A * 7/1999 Dunworth et al. .......... 707/217
5,940,584 A * 8/1999 Zufle ......................... 358/1.15
5,963,966 A * 10/1999 Mitchell et al. ............ 707/513
6,006,281 A * 12/1999 Edmunds ...................... 710/1
6,128,603 A * 10/2000 Dent et al. .................... 705/40
6,128,633 A * 10/2000 Michelman et al. ........ 715/525
6,161,107 A * 12/2000 Stern .......................... 707/104
6,304,857 B1 * 10/2001 Heindel et al. ............... 705/34
6,385,595 B1 * 5/2002 Kolling et al. ................ 705/40
6,631,495 B2 * 10/2003 Kato et al. .................. 715/500

* cited by examiner

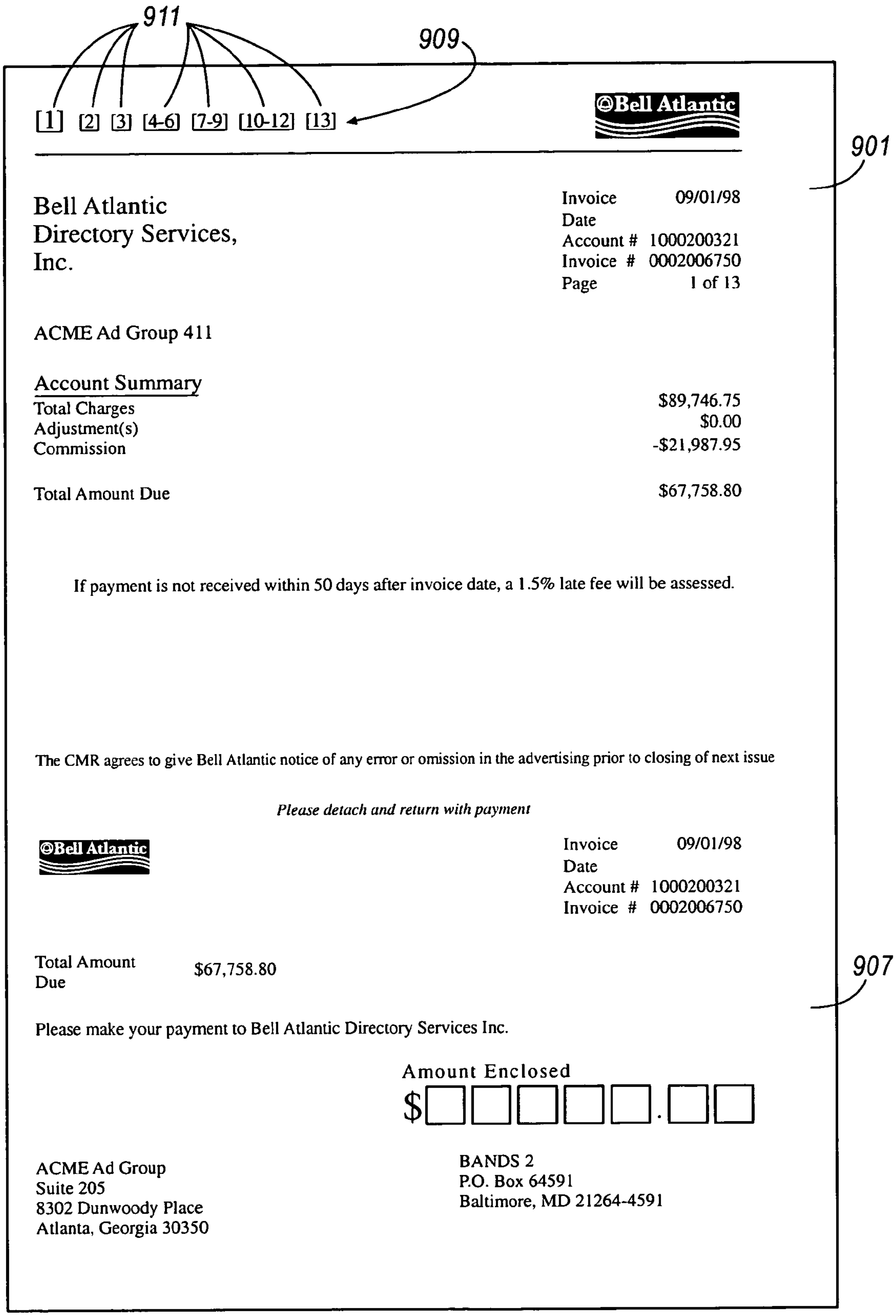
911 909

[1] [2] [3] [4-6] [7-9] [10-12] [13]

Bell Atlantic

901

Bell Atlantic
Directory Services,
Inc.

| | |
|---|---|
| Invoice Date | 09/01/98 |
| Account # | 1000200321 |
| Invoice # | 0002006750 |
| Page | 1 of 13 |

ACME Ad Group 411

Account Summary

| | |
|---|---|
| Total Charges | $89,746.75 |
| Adjustment(s) | $0.00 |
| Commission | -$21,987.95 |
| Total Amount Due | $67,758.80 |

If payment is not received within 50 days after invoice date, a 1.5% late fee will be assessed.

The CMR agrees to give Bell Atlantic notice of any error or omission in the advertising prior to closing of next issue

*Please detach and return with payment*

Bell Atlantic

| | |
|---|---|
| Invoice Date | 09/01/98 |
| Account # | 1000200321 |
| Invoice # | 0002006750 |

Total Amount Due $67,758.80

907

Please make your payment to Bell Atlantic Directory Services Inc.

Amount Enclosed
$ _ _ _ _ _ . _ _

ACME Ad Group
Suite 205
8302 Dunwoody Place
Atlanta, Georgia 30350

BANDS 2
P.O. Box 64591
Baltimore, MD 21264-4591

FIG. 9A

METHOD, STORAGE MEDIUM AND SYSTEM FOR ELECTRONICALLY VIEWING MULTI-PAGE DOCUMENT WHILE PRESERVING APPEARANCE OF PRINTED PAGES

BACKGROUND OF THE INVENTION

The present invention is directed to a system and method for preparing and distributing an electronic version of a printed document that preserves the appearance of the printed pages and is further directed to a persistent electronic storage medium on which such an electronic version is distributed. In particular, the present invention is directed to an electronic Yellow Pages viewer and to an electronic billing system including a tear sheet, in which the appearance of a printed page of a Yellow Pages directory is preserved.

Telephone and other companies have long distributed Yellow Pages directories in printed and bound form, typically annually. Such directories are typically distributed free of charge, with revenue coming from the sale of advertisements. Some directory advertising is also sold for White Pages directories.

Advertisements in a Yellow Pages directory can include only text or both text and graphics; the advertisements can vary in size from one line to a full page or possibly more. The process of laying out the directory includes assigning each advertisement to a page and to a position on that page according to techniques such as those disclosed in U.S. Pat. No. 5,390,354 to de Heus et al. Such techniques generally have a goal of minimizing wasted space, which is normally not possible if the advertisements are simply arranged in a linear order and "poured" into each column.

Once the directory is laid out, printing data are generated to allow a printer to print the page. Typically, the printing data are in encapsulated PostScript (EPS) page description language, and the graphics on each page are also in encapsulated PostScript format. PostScript is not optimized for file size; in fact, the printing data for a single page typically consume several megabytes, with the size varying with such factors as the complexity of the layout, the number of graphical elements, and the complexity of each graphical element.

It is expensive to print and distribute Yellow Pages directories to customers. In large organizations, the directories could be mislaid. They also have to be recycled or otherwise disposed of.

To address those issues, various companies have provided electronic Yellow Pages directories, typically accessible over the Internet. One example is BigYellow$^{SM}$SM, published by Bell Atlantic Electronic Commerce Services, Inc. A user accesses the directory through its home page, which includes a search form with text boxes to allow the user to search by any or all of the category, the business name, the city and the state. When the user enters a search, a CGI script searches a database, generates an HTML page of hits, and returns that HTML page to the user.

Directories of that type can be accessed from any computer that can connect to the Internet and that can run a Web browser. However, such directories present an interface that may be unfamiliar to many users, in that the interface bears no resemblance to a traditional bound Yellow Pages directory and provides no "advertiser branding" through graphic information.

Simply providing users with the printer data would not be practical for several reasons. The size of the printer data makes distribution of the printer data burdensome on media such as CD-ROM's and out of the question over the Internet. Not all users are equipped to handle PostScript files. A desired page or range of pages would still have to be manually located and printed or otherwise imaged.

Similar issues present themselves in billing. Certain advertisers in a traditional bound Yellow Pages directory receive a bill that includes a tear sheet, which is the sheet from the directory on which that advertiser's entry appears. The tear sheet, to be of any use, must faithfully reproduce both the content and the layout of what will be printed. No satisfactory electronic replacement for the hard-copy tear sheet is known in the art. Without such an electronic replacement, the advantages of electronic billing, such as automated reconciliation of billing statements, are beyond reach. Also, while it would be useful to provide each advertiser with a tear sheet on which that advertiser's entry was highlighted, such highlighting on hard-copy tear sheets is impractical.

In a different field of endeavor, it is known to store bitmapped representations of the pages of printed documents in combination with an indexing scheme for accessing them. For example, U.S. Pat. No. 5,623,681 to Rivette et al teaches a method and apparatus in which documents such as patents are stored in both text and image formats on a CD-ROM or the like. The text files are ASCII text representations of the documents, while the image files are bitmap files produced by scanning hard copies. The text and image files are analyzed to produce an "equivalent file" that formats the text with the same line numbers, line breaks, column numbers and column breaks as in the images. The equivalent file is then indexed. A user can display the equivalent file and the image file in side-by-side relationship with synchronization between the views so that the same portion of the document is displayed in both formats.

The use of both text and bitmap representations of the pages allows easy access to a faithful representation of each page. However, the user must install special viewing software. Therefore, the publisher must provide such viewing software for as many operating systems as the relevant market requires. Also, the printer data used to generate each page are not readily available. Instead, a hard copy of each page must be scanned in to create the bitmap image, and the formatting information must be reconstructed from that bitmap image through OCR.

SUMMARY AND OBJECTS OF THE INVENTION

In view of the foregoing, it will be readily apparent that there exists a need in the art for practical electronic distribution of a Yellow Pages directory or other similar publication that preserves the appearance of the printed version.

It is therefore an object of the invention to provide a system and method of preparing such a publication for electronic distribution in which the formatting of each page is preserved without the requirement for scanning a hard copy of each page.

It is another object of the invention to convert the printing data for each page into a compact, easily viewable format that shows the image of the printed page.

It is still another object of the invention to provide an indexing scheme for the page images to allow a user to access the page images in essentially the same manner in which the user would look up an entry in the printed version.

It is yet another object of the invention to distribute the publication in any of several manners while requiring little or no new investment in hardware or software by users, or in other words, by use of a communication infrastructure or other electronic equipment that is already in place and with software that is already widely in use.

It is a yet further object of the invention to provide the publication in a platform-independent manner, so that both the appearance of the publication and its ease of use will be uniform or substantially uniform for users accessing the publication on a variety of computers and operating systems.

To achieve the above and other objects, the present invention is directed to an electronic Yellow Pages directory that displays the pages of the directory as they would appear in the bound directory and that allows access through conventional interface software, e.g., a Java-compatible Web browser. The PostScript file for each page to be printed is converted into an image (e.g., a JPEG or GIF bitmap file) to compress the page information. A Java applet indexes each category in the Yellow Pages directory to the image file of the first page on which that category appears. The Java applet also controls the Web browser to display a user interface having "back," "forward," "reload" and "help" buttons and text boxes for typing a category and a page number. A window in the user interface has a left pane with the categories in tree format and a right pane that shows the image file of the page being viewed. The view of the page can be zoomed. The Java applet and the image files can be published on a CD-ROM or over the Internet.

The present invention is further directed to a billing system in which a Yellow Pages advertiser receives a bill accompanied by the image file for the page having that advertiser's advertisement, or in other words an electronic tear sheet. The advertiser's bill can be highlighted on the page image on command to facilitate ease of review.

BRIEF DESCRIPTION OF THE DRAWINGS

Preferred embodiments will now be set forth in detail with reference to the drawings, in which:

FIGS. 9A–9C show a drawing of an electronic bill;

DETAILED DESCRIPTION OF THE PREFERRED EMBODIMENTS

Figure 1:
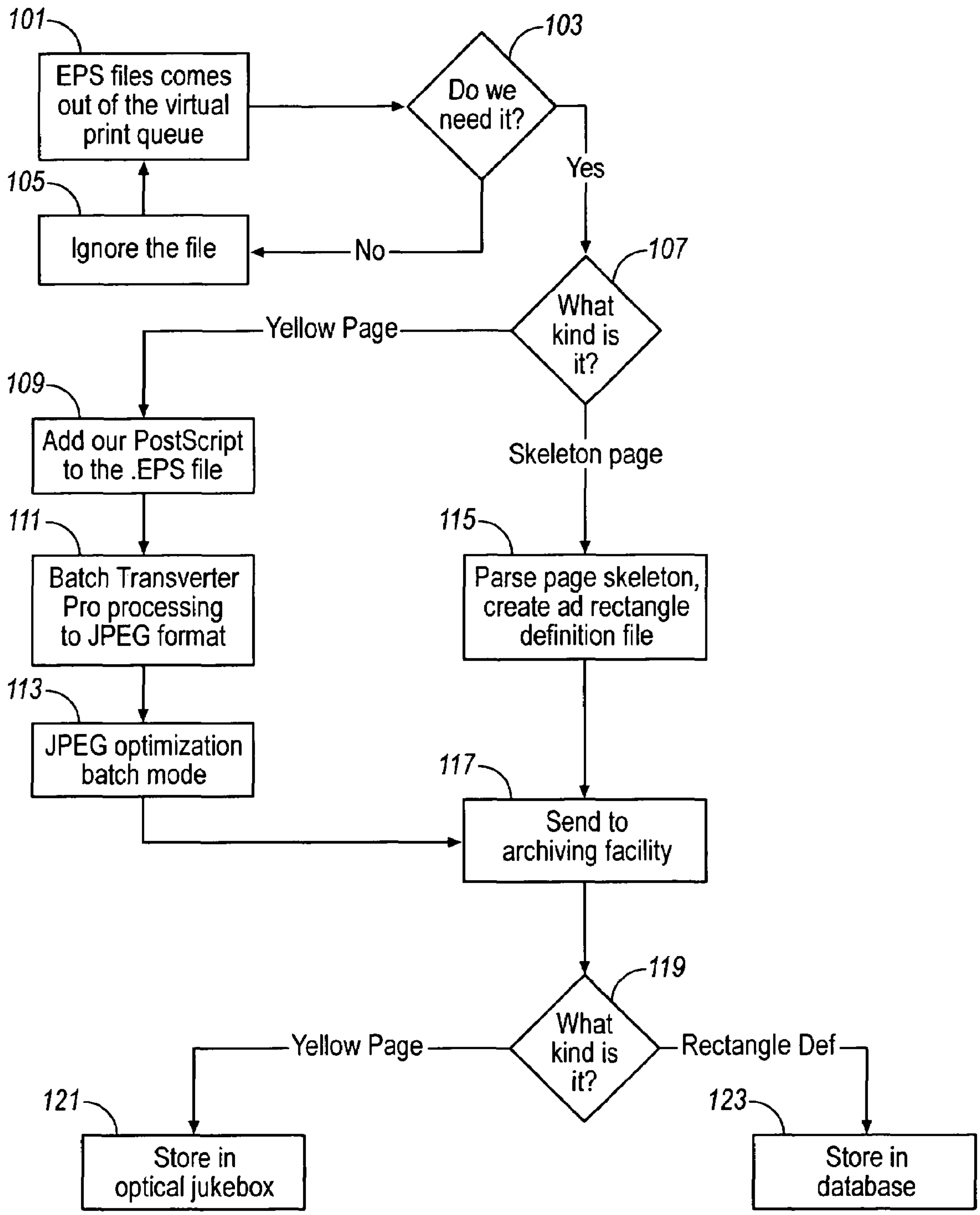
FIG. 1 shows a flow chart of operations used in converting the printer data into usable form.

Preferred embodiments of the present invention will now be described in detail with reference to the drawings, in which like components are designated by like reference numerals throughout. Reference will frequently be made to "persistent storage"; that term is intended to cover hard drives, optical and magneto-optical drives, and any other large-scale, non-volatile storage media.

The electronic Yellow Pages directory will be described first; afterwards, the electronic billing system will be described. Since the directory and the billing system are similar and can share any features as needed, the billing system will be described primarily in terms of its differences from the directory.

A Yellow Pages publisher such as Bell Atlantic typically produces printer data for output by an image setter. The Bell Atlantic directory print composition process builds and paginates encapsulated PostScript (EPS) files, each of which the image setter converts into a printed page. In the case of Bell Atlantic, the EPS files for the Yellow Pages directories for its both the northern and the southern regions are sent to an image setter in Valley Forge, Pa. At the point at which those files are sent to the image setter, a virtual print queue containing those files is intercepted.

Each EPS file is dequeued and archived. Each EPS file is then rasterized to convert it into a bitmapped file. The resolution of the bitmapped file should be sufficient to allow legibility of the text on screen and to allow zooming. Since a typical computer monitor has a screen resolution on the order of 100 dpi, whereas image setters operate at resolutions in the thousands of dpi, that requirement on the resolution of the bitmapped file is fairly lenient. The bitmapped file is then optimized to reduce its size and saved in a suitable format such as JPEG. The JPEG format is a bitmap file format featuring small file size through compression with a selectable level of loss. Because of the small file sizes, the JPEG format is popular on the Internet and in particular is widely supported, e.g., by Web browsers. The JPEG images can be optimized to reduce their size still further, e.g., up to 50%. The resulting image files are archived in persistent storage.

One software package available for the conversion of EPS to JPEG files is Transverter Pro™, published by TechPool Software of Carlsbad, Calif., which performs raster image processing on EPS files and saves the outputs as JPEG files. One software package available for optimization of the JPEG files is JPEG Optimizer™, published by XATech of Plymouth, Devon, U.K. Whatever software is used should preferably be able to operate in batch mode.

FIG. 1 shows a flow chart of the operations involved in the conversion just described. Each EPS file comes out of the virtual print queue in step 101. In step 103, it is determined whether the file is needed. For example, a page file is needed, while a file representing the inside back cover is not. The determination may be made by examining the file name. If the file is not needed, then it is ignored in step 105, and the next file is awaited.

If the file is needed, then it is determined in step 107 whether the file is a page file or a page skeleton file. A page file includes the full printing data for a page, while a page skeleton file shows merely the outline of each ad on a page. If the file is a page file, whatever additional PostScript code is needed for processing is added in step 109. The page file is converted to the image format in step 111 by a converter program running in batch mode, and the image file is optimized by an optimizer program running in batch mode in step 113.

On the other hand, if the file is a page skeleton file, it is parsed in step 115 to create an advertisement rectangle definition file providing locations of the four corners of each advertisement. That definition file can be used in the electronic billing system to highlight the particular advertisement that is being billed, as will be explained in detail below. For the Yellow Pages viewer, the definition file is not required.

The outputs of steps 113 and 115, namely, the optimized image files and advertisement rectangle definition files, are sent to an archiving facility over a suitable communication network in step 117. It is preferable not to send information to the archiving facility earlier in the process to avoid tying up the network with the large EPS files. The optimized image files and the advertisement rectangle definition files can be sent as they are created or held and then sent as a batch for the entire book.

Once the archiving facility receives the files, it determines the kind of each file in step 119. An image file can be recognized by the extension of its filename, typically .JPG or .GIF. If the file is an image file for a page in the Yellow Pages directory, it is archived in persistent storage, typically an optical jukebox, in step 121. One manufacturer of suitable optical jukeboxes is Hewlett-Packard. A rectangle definition file is added to a database of rectangle definitions in step 123.

Once the image files are formed, they allow viewing of an image of every page in the directory as it is to be printed. However, to be useful, the files should preferably be indexed somehow. In particular, for an online directory, it is desirable to provide a page and category (header) index so that a user can access a particular page by its page number or by a category found on that page. Since it is common for categories to span multiple pages, it is contemplated that each category will be indexed to the first page on which the category occurs. For an electronic billing system, it is desirable to identify the page on which a particular advertisement appears and the page that will be printed on the opposite side of the same sheet in the printed directory; it is also desirable to highlight the position of the advertisement on the page.

One way to compile the information just described is to provide an interface, called a directory print composition interface, with the system that composed the original EPS representations of the pages. Such a system typically runs an Oracle DBMS, provided by the Oracle Corporation of Redwood, Calif., that indexes each advertisement by the spine number of the directory in which the advertisement appears, the advertisement number which identifies the advertisement within the directory, the heading (category) under which the advertisement appears and the page on which the advertisement appears when the directory is composed. Such information can be used to match each category with the first page on which it appears, which allows a user to type in the name of a category and be taken to the appropriate page. That information, combined with the rectangle definition file, can be used in the electronic billing system to highlight the specific advertisement. The directory print composition interface should be customizable to accommodate EPS files and page/advertisement/category indexing data from any directory publisher. Also, any other source of the needed information can be used, such as a text file of page/heading information or of advertisement rectangle information.

Figure 2:
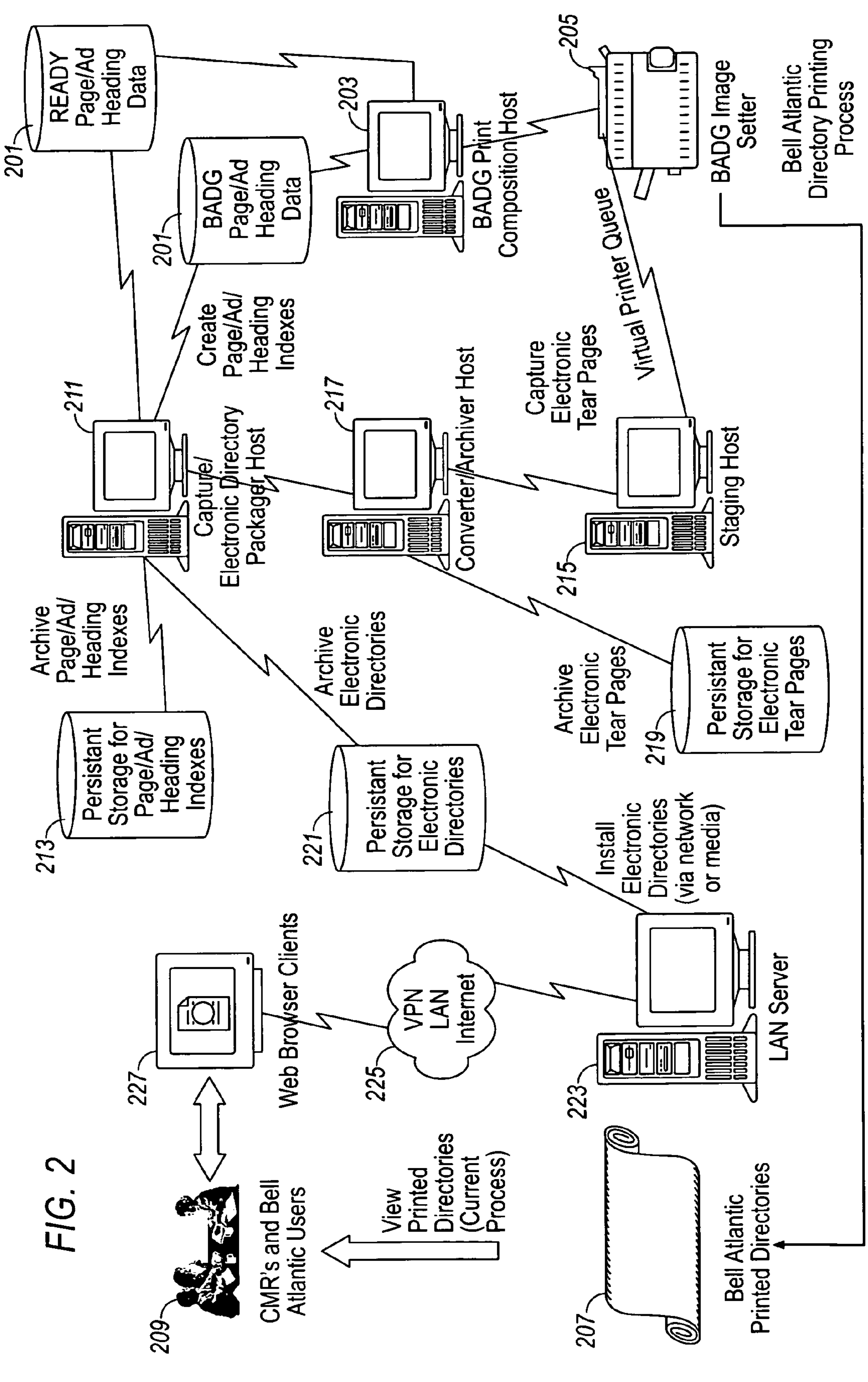
FIG. 2 shows a schematic diagram of a system for compiling an electronic Yellow Pages directory.

FIG. 2 shows a high-level schematic diagram of a system for compiling an electronic Yellow Pages directory. Such a system is a superset of a conventional system for printing the directory.

Page/advertisement/heading data 201 from one or more sources—in this case, two sources within Bell Atlantic—are supplied to a print composition host 203 which composes the pages and produces the EPS files. The EPS files are output to an image setter 205 which prints the pages to be formed into printed directories 207, which are used by users 209, such as telephone subscribers and CMR's (certified marketing representatives). That much is conventional.

In addition to the above, the page/advertisement/heading data 201 are supplied to a capturer/electronic directory packager host 211 which creates page/advertisement/header indices and stores the indices in persistent storage 213. In the meantime, the printer queue from the composition host 203 to the image setter 205 is diverted as a virtual printer queue to a staging host 215 which supplies the needed EPS files to a converter/archiver host 217. The converter/archiver host 217 converts the EPS files into image files in a manner such as that explained above and archives the image files in persistent storage 219. The capturer/electronic directory packager host 211 uses the indices stored in the persistent storage 213 to match the headers with the page numbers to form a directory, which is then archived in persistent storage 221.

The directory in persistent storage 221 can be made available to the users 209 in any of a variety of ways. The directory can be accessed over a communication network such as the Internet, a LAN, or a VPN (virtual private network). In conjunction with such delivery modes, or as an alternative, the directory can be placed on a computer-readable medium such as a CD-ROM. One preferred mode of distribution is to install the directory, via either a network or media, on a LAN server 223. The LAN server 223 then makes the directory available over the LAN 225 to the users 209, who view the directory on clients 227 running Web browsers.

A client 227 or other computer used to access the directory, whether locally or over any sort of network, should preferably meet or exceed the following specifications:

- PC with an Intel or compatible CPU, or Macintosh with a Motorola Power PC CPU; either way, the clock speed should be at least 166 MHz
- 15" monitor (or better yet, 17")
- 8×CD-ROM drive (for local access); Ethernet connectivity with a standard RJ-45 female connector (for network access)
- 32 MB Ram (or better yet, 64 MB)
- A mouse or equivalent pointing device A PC should run Netscape Communicator 4.05 or later on Windows NT 3.51 or later or Windows 95/98 or later. A Macintosh should run Microsoft Internet Explorer 4.01 or later on MacOS 8.1 or later. As noted in more detail below, the browser can be supplied on the same CD-ROM as the Yellow Pages directory. While a working embodiment of the present invention has been tested with the operating systems and browser software just noted, it should easily be adapted to other sufficiently powerful operating systems, such as Linux, and to any browser supporting Java 1.1 or later.

The CD-ROM itself is organized thus.

The root directory of the CD-ROM includes files called GO.HTM, AUTORUN.INF and README.TXT. The file README.TXT is designed to be read by the user and includes release notes, troubleshooting tips, and the like.

Certain operating systems, such as Windows 95 and 98, search the root directory of each CD-ROM that is inserted for a file called AUTORUN.INF and execute it if found. The AUTORUN.INF file consists of the following lines:

```
[autorun]
open=install/setup.exe
```

Thus, when AUTORUN.INF is run, it in turn controls the operating system to run SETUP.EXE from the INSTALL directory. Of course, for the benefit of those users whose operating systems do not support AUTORUN.INF or who have turned off support for AUTORUN.INF, the liner notes of the CD-ROM can identify the file that the user is supposed to execute and the directory in which it is located.

The file GO.HTM is an HTML file that consists of the following lines:

```
<HTML>
<HEAD>
  <META HTTP-EQUIV="Content-Type"
    CONTENT="text/html; charset=iso-8859-1">
  <META NAME="Author" CONTENT=" Stan Silver">
  <META NAME="GENERATOR"
    CONTENT="Mozilla/4.04 [en] (Win95; I)
[Netscape]">
  <TITLE>go</TITLE>
</HEAD>
<BODY>
<META HTTP-EQUIV="REFRESH" CONTENT="0;
  URL=Full/YPer/FullYPer.htm">
</BODY>
</HTML>
```

Thus, the GO.HTM file, when loaded into a browser, redirects the browser to another HTML file called FULLYPER. HTM in the directory FULLYPER.

The CD-ROM also includes the directories BOOK, FULLYPER and INSTALL. The BOOK directory holds the JPEG files, one for each page. The JPEG files range in size from 136 kB to 366 kB in accordance with the complexity of each page. If the CD-ROM is to contain more than one directory, the JPEG files can be grouped into multiple levels of directories, e.g., one level to indicate the area served and one level to indicate the publication date.

The FULLYPER directory includes the above-referenced FULLYPER.HTM file and the Java archive AMD.JAR. The FULLYPER.HTM file includes the following lines:

```
<HTML>
<HEAD>
<TITLE>
Bell Atlantic Directory Services—Yellow Pages CD-ROM
  Viewer
</TITLE>
<!--
Yellow Pages CD-ROM Viewer Applet
Version 1.0
February 1998
-->
</HEAD>
<BODY BGCOLOR="black">
<APPLET
ARCHIVE="AMD.jar"
CODE="com.synxis.louie.AMDApplet.class"
NAME="YellowPagesCDROMViewerApplet"
WIDTH=100%
HEIGHT=100%
HSPACE=0
VSPACE=0
ALIGN=Middle
MAYSCRIPT
>
</APPLET>
This applet requires Java 1.1.
</BODY>
</HTML>
```

Thus, the file is an HTML file that simply loads the Java archive, which will be described in detail below.

The INSTALL directory contains the files for the installation routine. The installation routine, which is started by the AUTORUN.INF file, checks for the presence of a sufficiently recent browser (e.g., Netscape 4.04 or later). If such a browser is absent from the system, the installation routine offers to install one. The distribution files for such a browser can also be provided in the INSTALL directory. The routine ends by loading GO.HTM.

Figure 3:
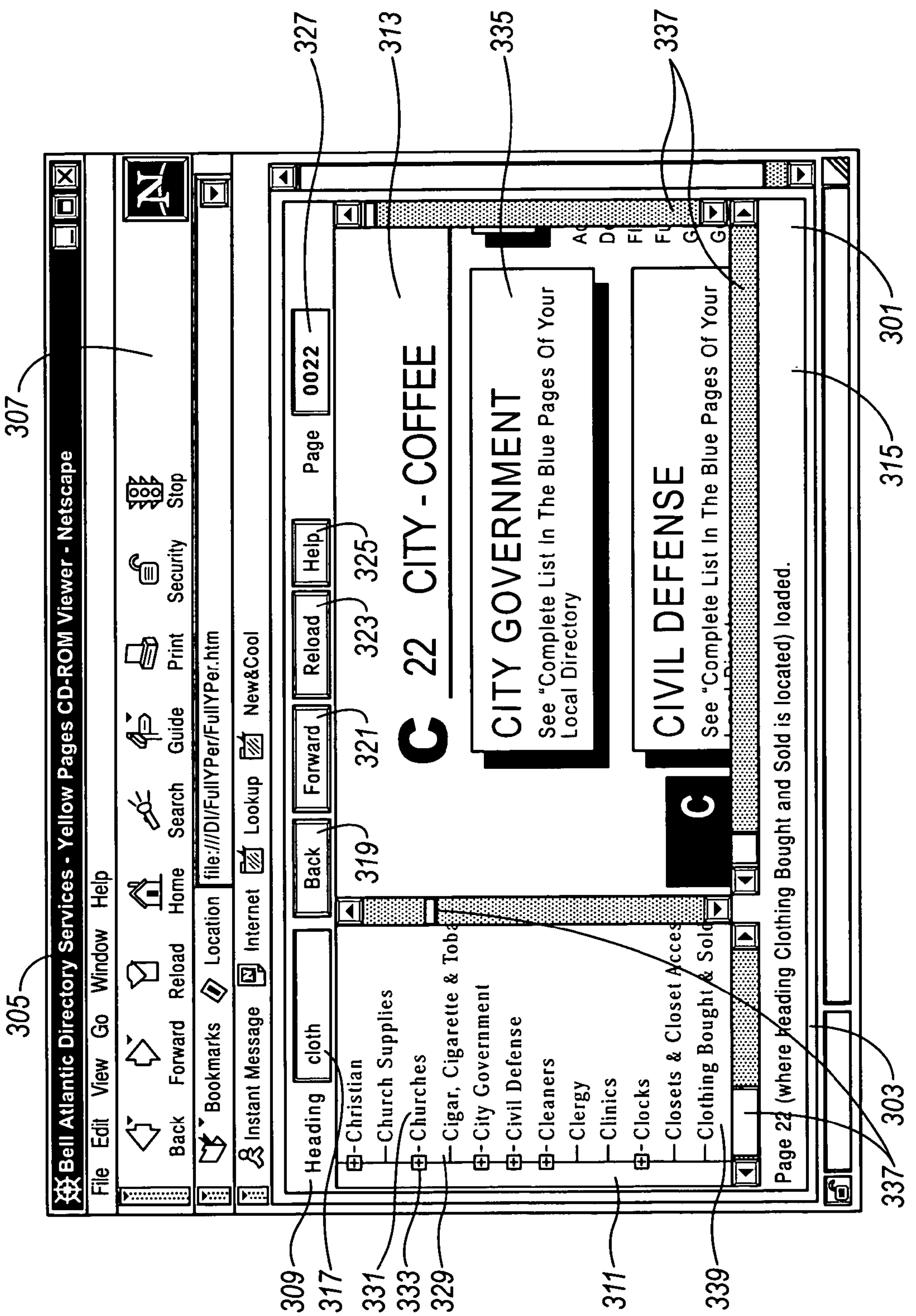
FIG. 3 shows a graphical user interface for viewing the electronic Yellow Pages directory.

The Java archive presents the user with a GUI which enables the user to locate any page in a Yellow Pages directory, either by page number or by heading, and to view that page with various degrees of zooming. FIG. 3 shows the GUI running in a window 303 of a standard Web browser 305, namely, Netscape 4.04 for Windows 95. Above the window 303, the browser 305 displays its own menu bar, task bars and other controls 307. The GUI 301 in the window 303 has a top bar 309, two panes 311, 313 and a bottom bar 315. The top bar 309 has a text box 317 for typing a heading name, buttons 319, 321, 323, 325 labeled "Back," "Forward," "Reload" and "Help," and another text box 327 for typing a page number. The left pane 311 displays the headings of the directory in a tree view 329, which is initially un-hit) expanded; for example, under the heading 331 for "Churches," sub-headings for churches of various denominations can be displayed by clicking on the plus sign 333. The right pane 313 displays the current page 335. The bottom bar 315 is a status bar stating that the page with the selected category is loaded. Both panes have vertical and horizontal scroll bars 337 as needed.

The user can go to a page in one of three ways. The easiest way is to scroll through the headings in the tree view 329 in the left pane 311 and to click on the desired heading. Alternatively, the user can begin typing in the heading text box 317. As shown, the user has typed "cloth," and the left pane 311 has highlighted the first heading beginning with those letters, which is the heading 339 for "Clothing Bought & Sold." Either way, the GUI 301 consults its page and heading index to find the first page on which that heading 339 is located, which is page 22, and displays that page as the current page 335. The third way is to type a page number in the text box 327 marked "Page."

The JPEG file for the selected page 335 is accessed, and the selected page 335 is displayed in the right pane 313, initially beginning with the upper left hand corner and extending as far as the size of the right pane 313 and the level of zooming allow. The user can zoom in or out by clicking on the page image with the left or right mouse button. On a Macintosh, which normally does not have a right mouse button, a combination of the mouse button with an appropriate key on the keyboard can be used instead. The user can also scroll by using the scroll bars 337.

The "Back" button 319 and the "Forward" button 321 control the GUI 301 to go back and forward by one page, respectively. The "Reload" button 323 reloads the page in its original view in case the user has zoomed or scrolled in the page. The "Help" button 325 calls a limited amount of help text in the Java archive; in another embodiment, that button could call a stand-alone help file.

The GUI 301 could be configured to show the selected page beginning not with the upper left corner of the page, but with the location on the page 335 of the heading 339 "Clothing Bought & Sold." However, such a modification would increase the size of the Java archive significantly.

The organization of the Java archive which produces the GUI 301 will now be described with reference to FIGS. 4 and 5, which are diagrams in UML (Unified Modeling Language). The numbers by the paths represent multiplicities, which are the ranges of numbers of target objects associated with each source object.

Figure 4:
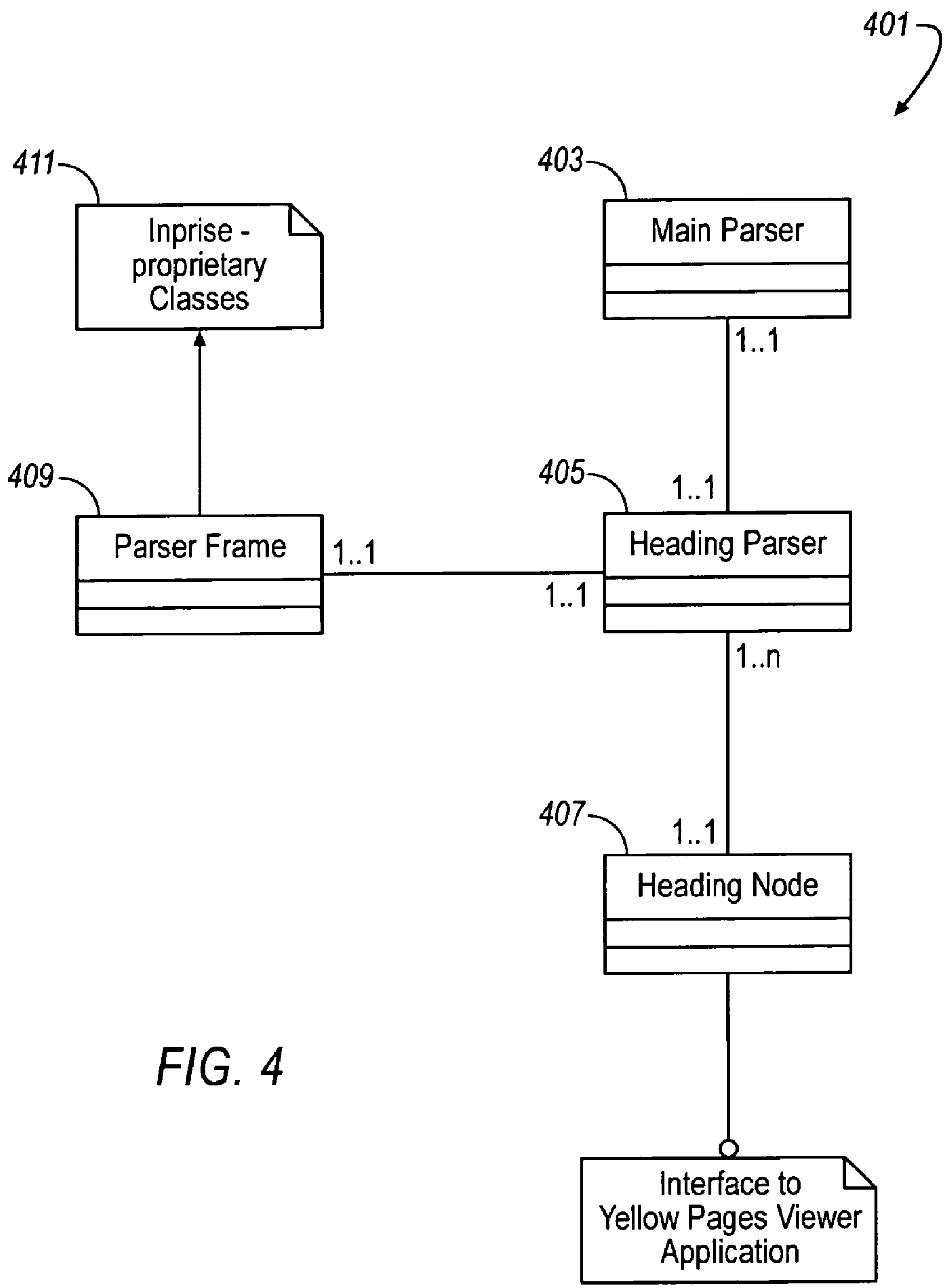
FIG. 4 shows a diagram of an application for parsing header information in the electronic Yellow Pages directory.

FIG. 4 shows a UML diagram of a heading parser application 401. In the application 401, the MainParser class 403 serves as a front end to receive descriptions of Yellow Pages headings from an input format (text file, Oracle database table, etc.). The MainParser class 403 can be adapted for one input format or for multiple formats. The HeadingParser class 405 converts the descriptions into a serialized tree of HeadingNode objects which are accessible through the HeadingNode class 407. The HeadingNode class 407 serves as an interface to the Yellow Pages viewer application, which will be described below with reference to FIG. 5.

The Heading Parser 405 is derived from a Parser Frame 409. As is known in the art, various Java classes such as scanners and parsers can be derived from frames, which are off-the-shelf text files which a programmer can adapt to specific requirements. In the present embodiment, the Parser Frame 409 was derived from classes proprietary to Inprise of Scotts Valley, Calif., U.S.A., a publisher of development kits such as JBuilder, although, of course, any suitable development kit could be used.

Figure 5A:
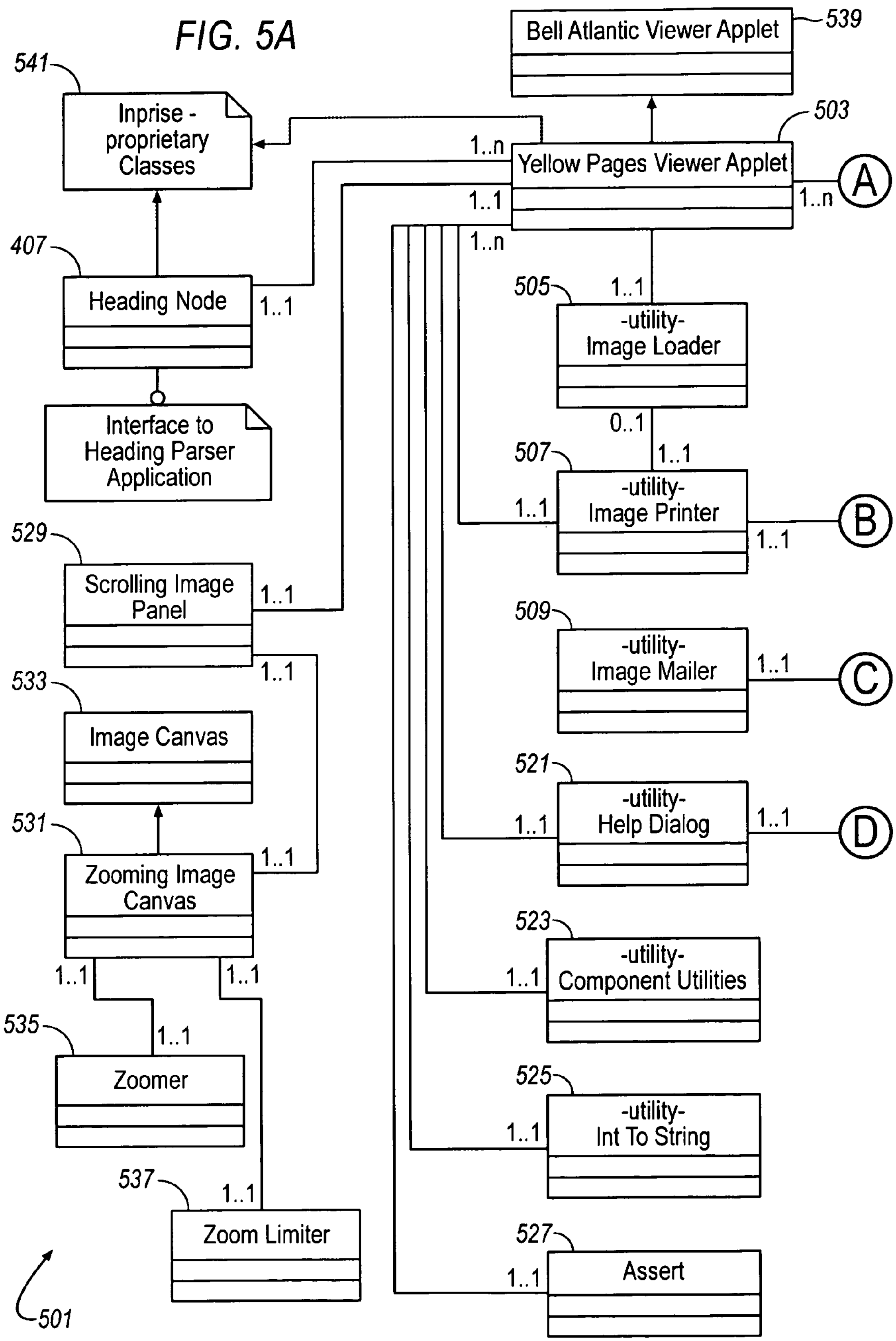
FIG. 5 shows a diagram of an application for displaying pages in the electronic Yellow Pages directory.
Figure 5B:
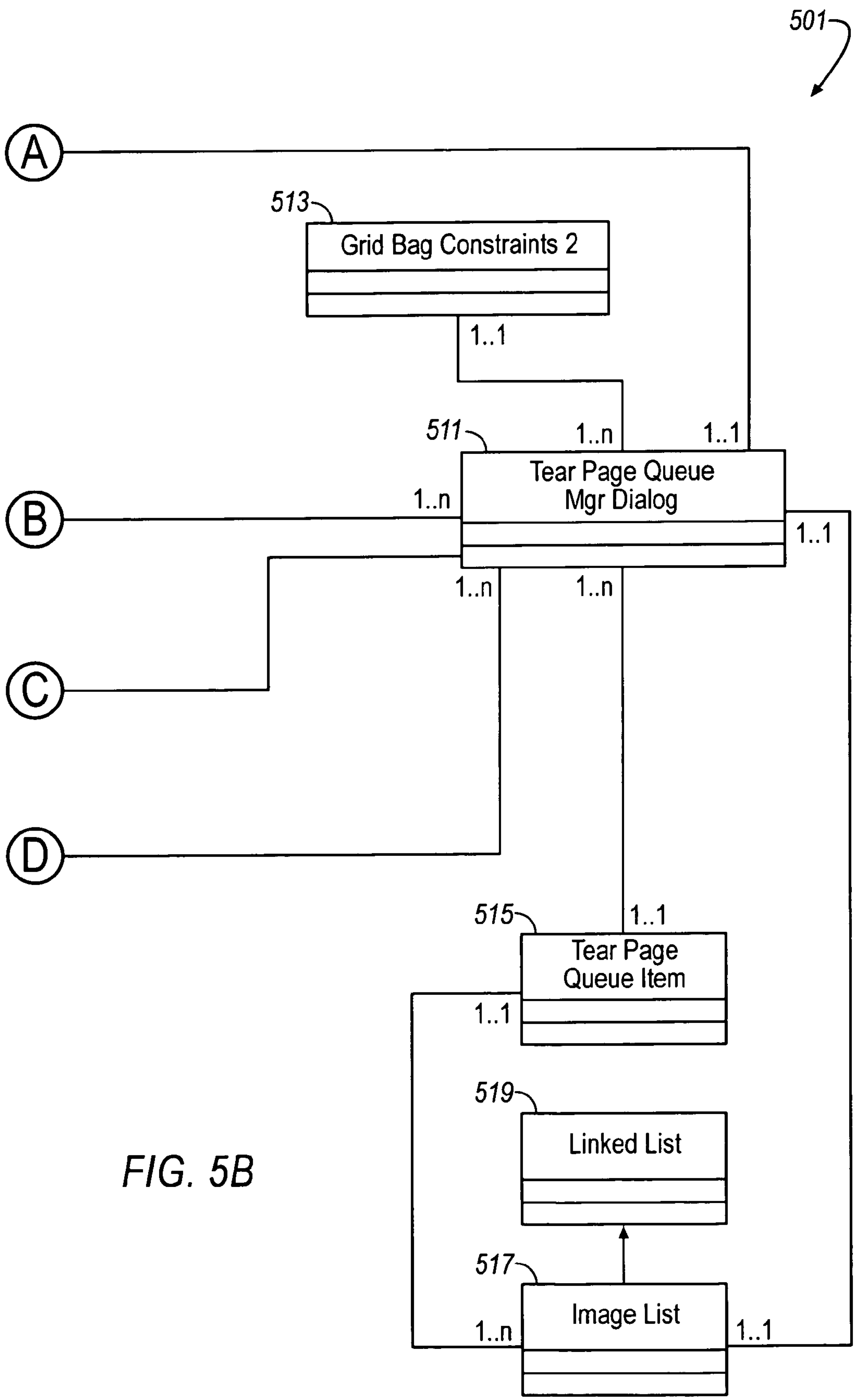

FIG. 5 shows a UML diagram of a Yellow Pages viewer application 501. The application 501 presents the user with a GUI, shown in FIG. 3 as the GUI 301, which enables the user to view a desired page. The user can zoom in and out, navigate backward and forward, search by heading or page number, print or e-mail a page and access a help function. A page queue is provided to allow forward and backward navigation. Page images can be printed or e-mailed. The complex functionality results in a large Java archive; however, the archive has to be loaded only once during a directory viewing session.

As noted above, the Heading Node 407 provides the interface between the applications 401 and 501. The Yellow Pages Viewer Applet 503 supplies the functionality which is specific to the application 501. The Image Loader 505 loads the JPEG file for the selected page. The Image Printer 507 interfaces with the printer driver of the operating system on which the Yellow Pages viewer runs to print the page, while the Image Mailer 509 interfaces with the operating system's e-mail services to e-mail the page. The queuing of pages in pagination order is under the control of the Tear Page Queue Manager Dialog 511, the Grid Bag Constraints 513 (which control the placement of windows on the screen), the Tear Page Queue Item 515, the Image list 517 and the Linked List 519.

The Help Dialog 521 displays a limited amount of help information stored in the Java archive; in future embodiments, if more detailed help is needed, a stand-alone help file can be summoned instead. Various off-the-shelf Java classes can be included, such as Component Utilities 523, IntToString (integer to string converter) 525 and Assert (tests the truth of assertions) 527.

Scrolling of the page 335 is under the control of the Scrolling Image Panel 529. Zooming of the page 335 is under the control of the Zooming Image Canvas 531, the Image Canvas 533, the Zoomer 535 and the Zoom Limiter 537. A viewer Applet 539 provides functionality common to the electronic billing system and the Yellow Pages viewer, such as identifying the page loaded and various navigation features. As noted above, Inprise-proprietary classes 541 or classes from another development kit can be used.

The electronic billing system will now be explained. The electronic billing system has the same hardware and operating system recommendations as set forth above for the Yellow Pages viewer. First, an overview will be provided with reference to FIG. 6, which is similar to FIG. 2. The process of rasterizing the pages has already been described with reference to FIG. 1; therefore, that description will not be repeated.

Figure 6:
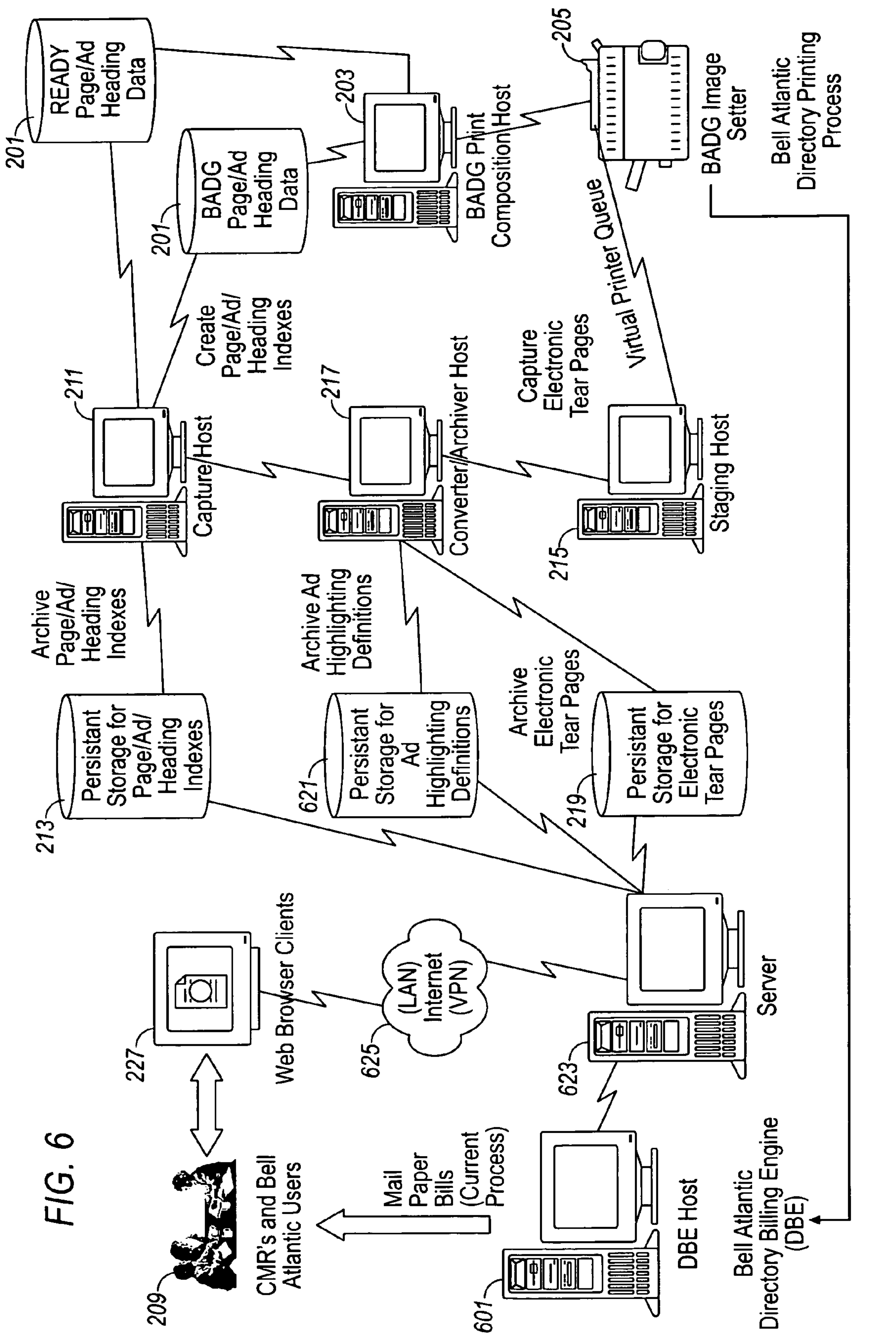
FIG. 6 shows a schematic diagram of a system for preparing electronic bills for Yellow Pages advertisers.

In FIG. 6, as in FIG. 2, the page/advertisement/heading data 201 from one or more Yellow Pages publishers are supplied to a print composition host 203, which produces a print queue and supplies it to an image setter 205. The image setter 205 provides each advertiser with a tear sheet, which is a sheet having the page on which the advertiser's advertisement appears and, of course, the page on the reverse side of the sheet. The tear sheets, along with printed bills generated by a directory billing engine 601, are mailed to the users 209. That much is conventional.

To generate the electronic bills, the capturer host 211, the staging host 215, the converter/archiver host 217, and the persistent storage 213 and 219 are used as explained above with reference to FIG. 2. In addition, the converter/archiver host 217 creates the advertisement highlighting definitions, which define a rectangle to be drawn around each advertisement, and store the advertisement highlighting definitions in a persistent storage 621. A server 623 accesses the information on the persistent storage 213, 219 and 621 and the directory billing engine 601 to generate electronic bills and to collate each advertiser's electronic bill with that advertiser's tear sheet and the advertisement highlighting definition for drawing a rectangle around that advertiser's advertisement. The electronic bill is typically in HTML format and can thus be shown in a Web browser with no need for additional software. Of course, if an advertiser has multiple advertisements in the same or multiple directories, a single bill can be associated with multiple tear sheets and highlighting definitions, as will be explained in detail below.

The bills and their associated tear sheets and highlighting definitions are made available over a network 625, which is typically the Internet, but can alternatively be a LAN, a VPN or another suitable network. The server can be password-protected so that each user can access only the appropriate bill or bills; for example, an advertiser can see only its own bills, while a CMR can see the bills for all the advertisers which that CMR serves. The users 209 use clients 227 with Web browsers installed thereon to view the bills.

The information needed to view the electronic bills, like the information needed for the Yellow Pages viewer, can be provided to the server 623 in various ways. One way is to prepare a CD-ROM with all information needed for the appropriate bills, plus a Java applet for viewing the bills, and to install the CD-ROM on the server 623. Alternatively, a CD-ROM could be prepared for each user 209 (advertiser, CMR or any other user) and provided to that user.

Figure 7:
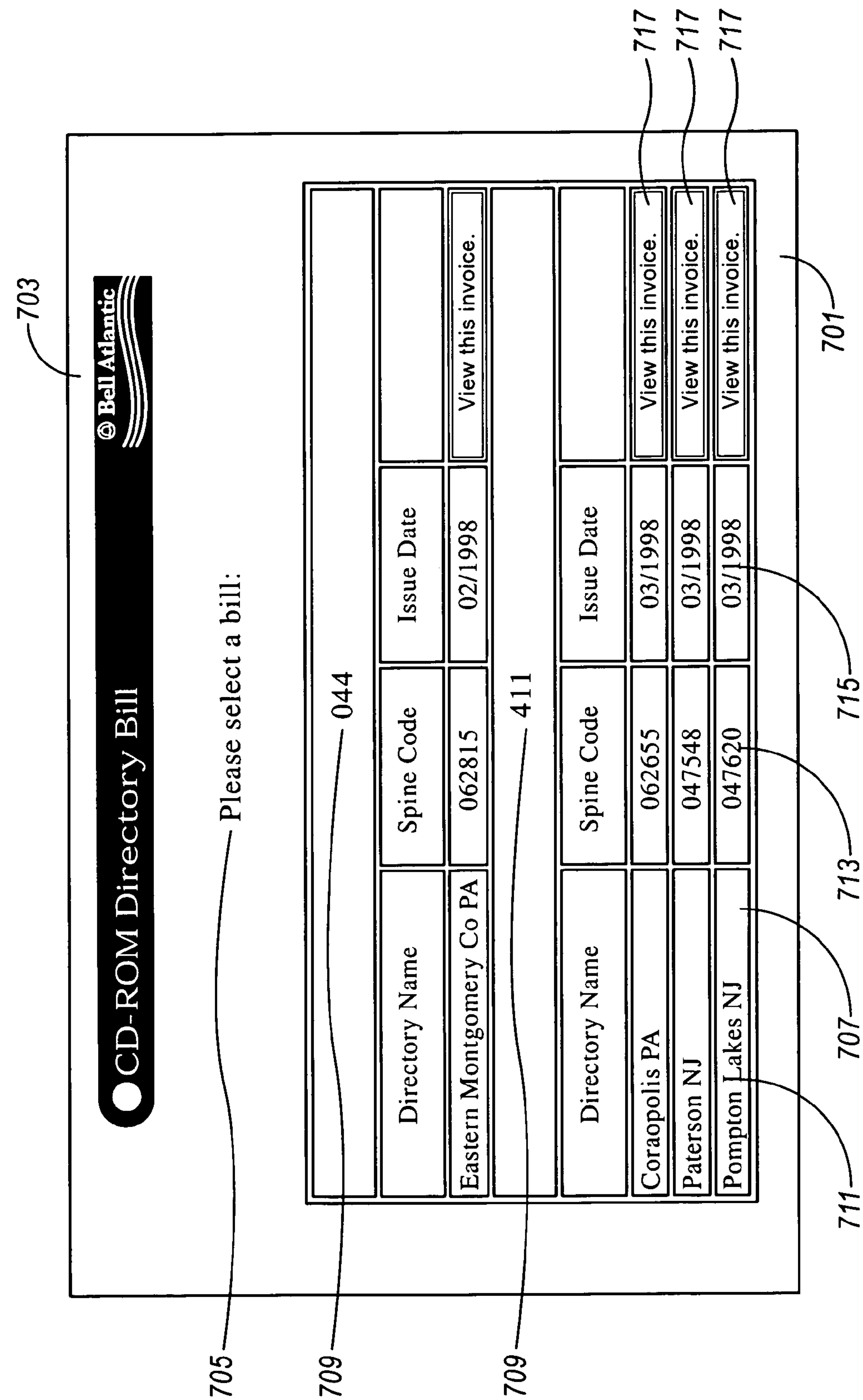
FIG. 7 shows a start-up screen of the electronic billing system.

When the electronic billing system is accessed, as by logging onto the network 625 or inserting the CD-ROM into a drive, the user's Web browser displays a page such as a page 701 shown in FIG. 7. The page 701 is produced by an HTML file which is stored in the root directory of the CD-ROM as GO.HTM. At the top of the page 701 is a company logo 703; directly below the company logo 703 is an instruction 705 saying, "Please select a bill:". The bills are grouped in a table 707 by an identifier 709 such as a CMR number; under each identifier 709 is a list of directories by name 711, spine code 713 and issue date 715. The entry for each directory also has a button 717 labeled "View this invoice." The button 717 can be grayed out if for any reason that invoice is unavailable.

The file GO.HTM includes the following lines:

```
<html>
<head>
<!--
  go.htm
  Version 1.4: Enabled all four test bills.
  Version 1.3: Ensured that you can go back to this GUI
    from a specific invoice.
  Version 1.2: Increased usability of GUI.
  Use: To select invoices from a list. This allows us to place
    more than one invoice on a CD.
-->
<script language="JavaScript">
function viewInvoiceNumbered(aString) {
  window.location.href="./bill/"+aString+"/index.htm";
}
</script>
</head>
<body>
<center>
<IMG SRC="baheader.gif" WIDTH=509 HEIGHT=41>
<form name="selectionForm">
<br>
<h3>Please select a bill:</h3>
<br>
<table border=1 width=600>
<tr>
<td colspan=4 align="center" valign="center"
  height=40><font size=+1>044<font></td>
</tr>
<tr>
<th width=200>Directory Name</th>
<th width=125>Spine Code</th>
<th width=125>Issue Date</th>
<th width=150><IMG SRC="synxis.gif"></th>
</tr>
<tr>
<td>Eastern Montgomery Co PA
<td align="center">062815
<td align="center">02/1998
<td align="center"><input type=button
  name="invoiceRadio" value="View this invoice." on
  Click="viewlnvoiceNumbered('00208011')"></td>
</tr>
<tr>
<td colspan=4 align="center" valign="center"
  height=40><font size=+1>411</font></td>
</tr>
<tr>
<th width=200>Directory Name</th>
<th width=125>Spine Code</th>
<th width=125>Issue Date</th>
<th width=150><IMG SRC="synxis.gif"></th>
</tr>
<tr>
<td>Coraopolis PA
<td align="center">062655
<td align="center">03/1998
<td align="center"><input type=button
  name="invoiceRadio" value="View this invoice."
on Click="viewInvoiceNumbered('00209635')"></td>
</tr>
  <tr>
<td>Paterson NJ
<td align="center">047548
<td align="center">03/1998
<td align="center"><input type=button
  name="invoiceRadio" value="View this invoice."
on Click="viewlnvoiceNumbered('00209262')"></td>
</tr>
<tr>
<td>Pompton Lakes NJ
<td align="center">047620
<td align="center">03/1998
<td align="center"><input type=button
  name="invoiceRadio" value="View this invoice."
on Click="viewlnvoiceNumbered('00209957')"></td>
</tr>
</table>
</form>
</center>
</body>
```

Thus, the page 701 uses JavaScript to summon a bill corresponding to the button clicked.

Figure 8:
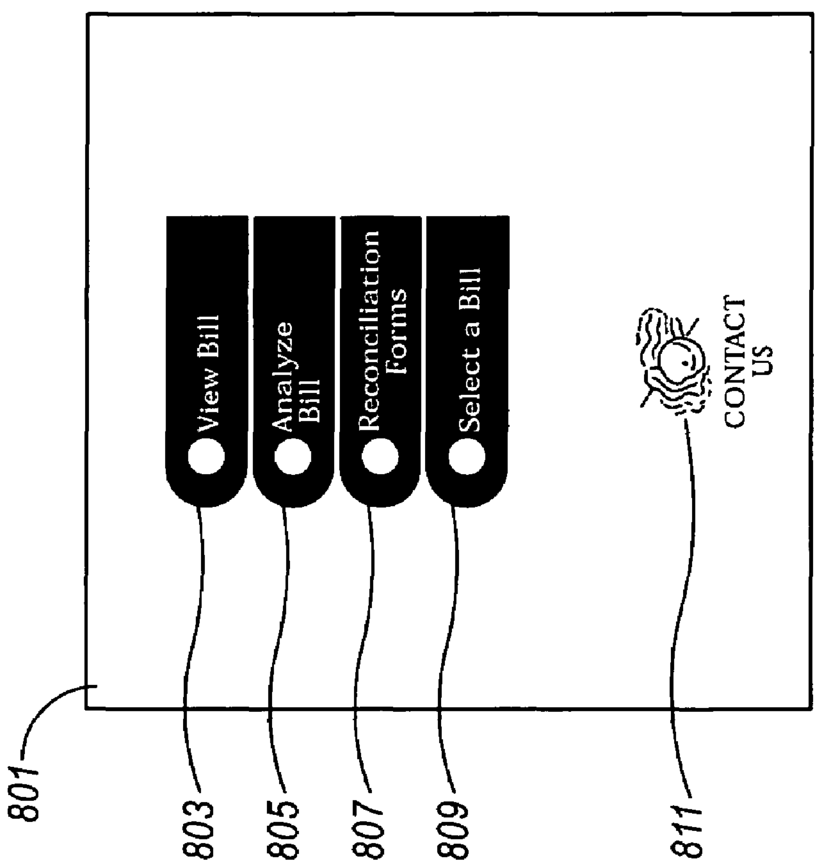
FIG. 8 shows a portion of a further screen of the electronic billing system.

When the user clicks on a "View this invoice" button 717, the electronic billing system displays a page including the frame 801 shown in FIG. 8. That frame 801 includes a "View Bill" button 803, an "Analyze Bill" button 805, a "Reconciliation Forms" button 807 and a "Select a Bill" button 809. It also includes a "Contact Us" button 811. The other frames can include company logos or the like. Each of the buttons 803–811 is implemented with a simple<a href= . . . >ink.

Figure 9B:
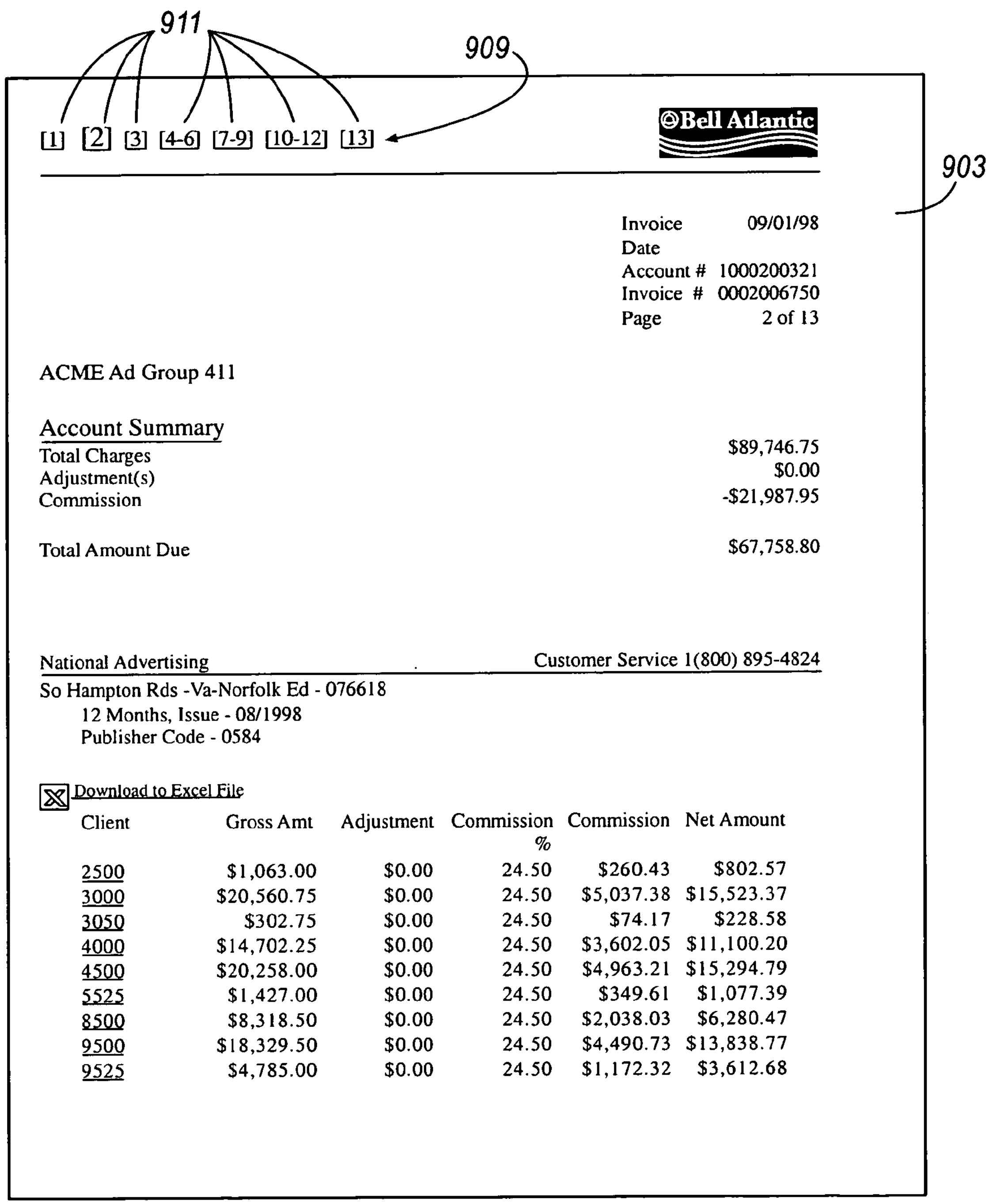
Figure 9C:
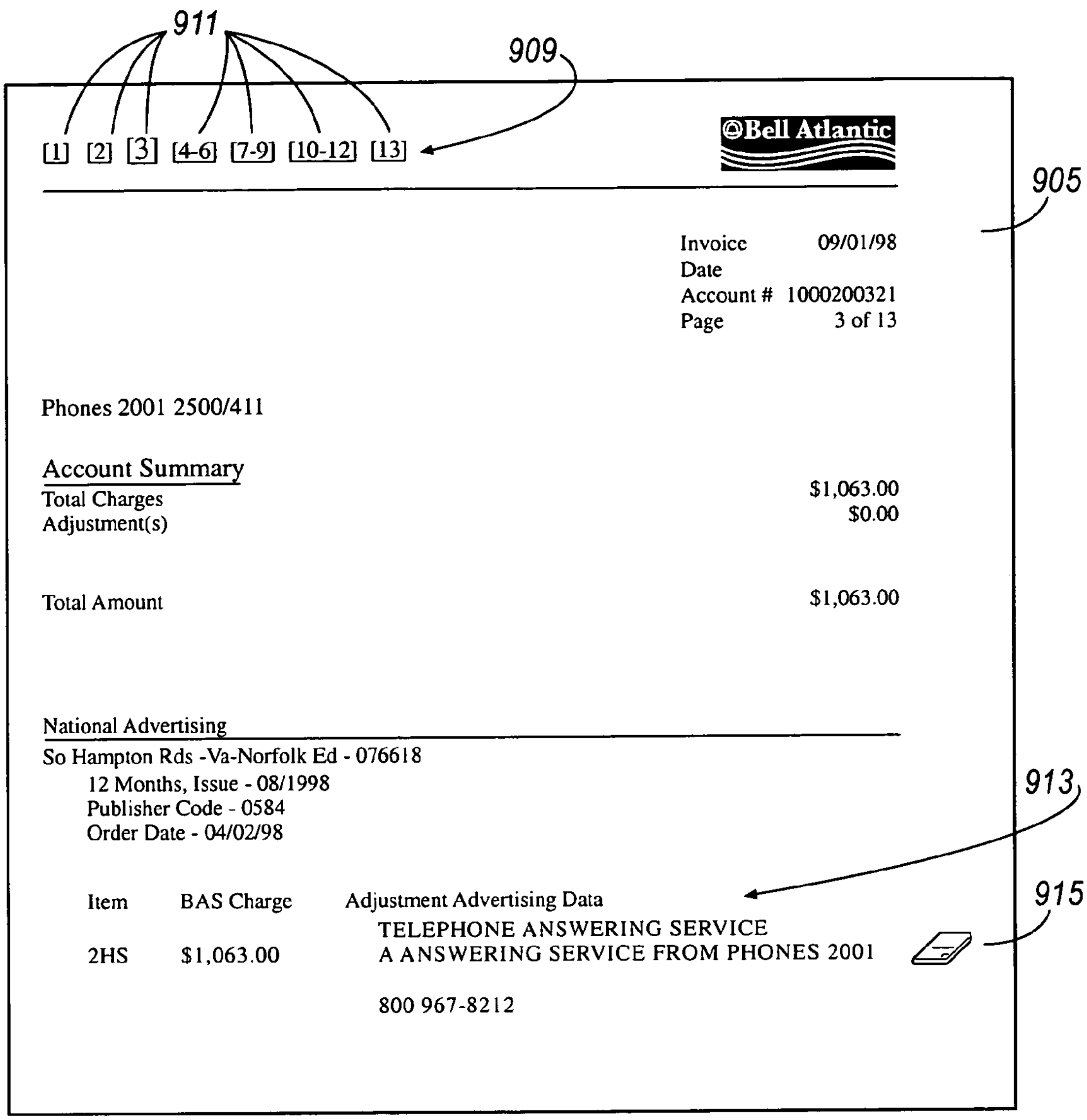

The "View Bill" button is linked to a bill having one or more pages such as pages 901, 903, 905 shown in FIGS. 9A–9C. The bill is formatted in HTML to resemble a traditional paper bill; in particular, the first part 901 includes a standard payment portion 907. Navigation bars 909 with page numbers 911 allow the user one-click access to each part of the bill. On the third page 905 of the bill is a list 913 of advertisements (only one shown in this particular bill), each with an icon 915 which is linked to the tear sheet viewer and shows the page of the directory on which the advertisement appears.

Figure 10:
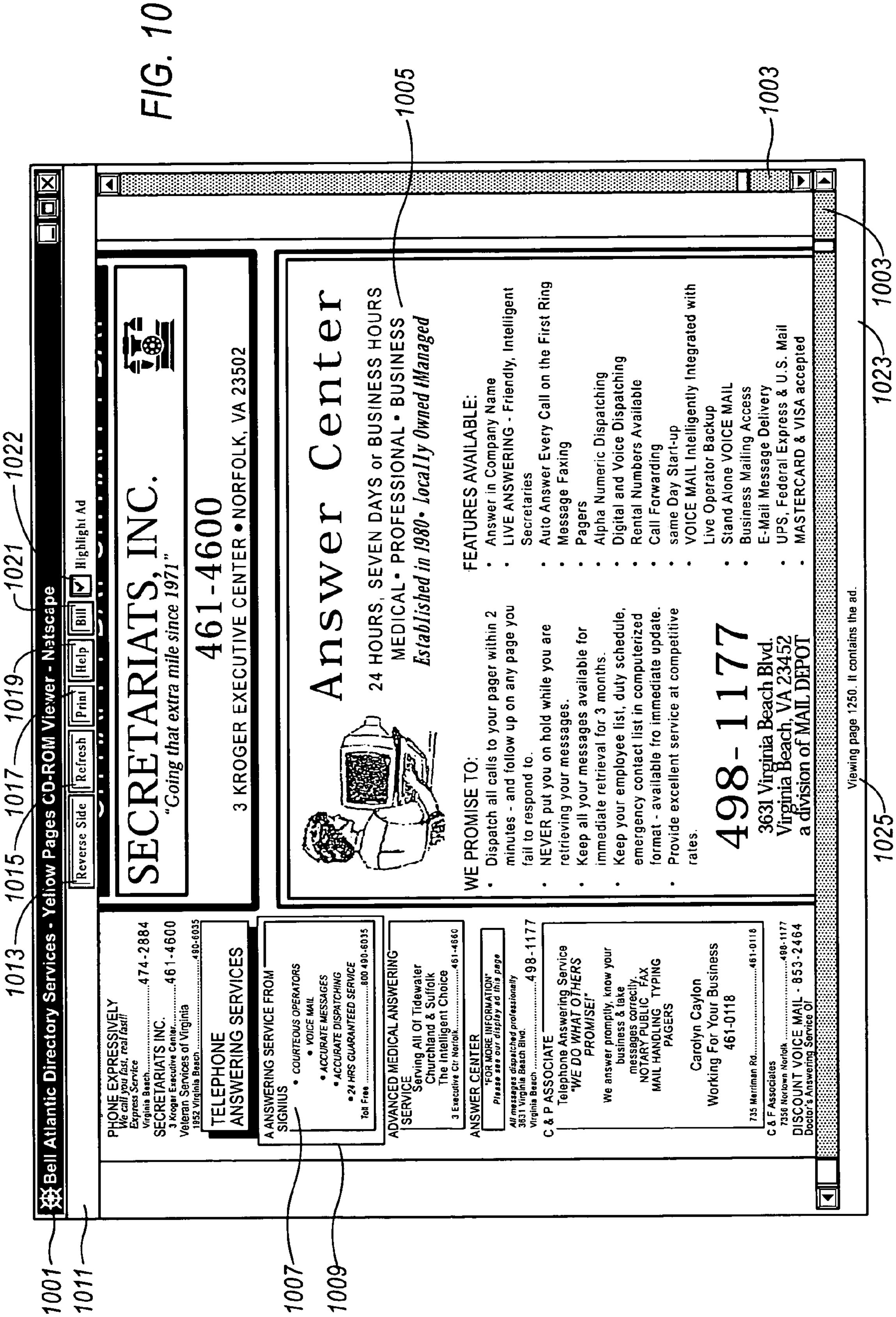
FIG. 10 shows a drawing of the tear page viewer of the electronic billing system with the relevant advertisement highlighted.

The tear sheet viewer 1001 is shown in FIG. 10. In FIG. 10, the user has scrolled with the scroll bars 1003 to the part of the page 1005 on which the advertisement 1007 appears. The advertisement 1007 is highlighted with a rectangle 1009. The viewer 1001 has a top bar 1011 with a "Reverse Side" button 1013 which shows the reverse side of the tear sheet, a "Refresh" button 1015 which reloads the page 1005 in case the image has disappeared, a "Print" button 1017 which prints the page, a "Help" button 1019 which summons a help file, a "Bill" button 1021 which returns the user to the bill shown in FIGS. 9A–9C and a "Highlight Ad" check box 1022 which lets the user toggle the display of the rectangle 1009 on or off. A bottom bar 1023 shows an indication 1025 saying which page is loaded and whether or not that page contains the advertisement 1007 which is the subject of the bill.

The following alternative interface for the tear pages viewer could be used. If the advertisement is associated with multi-page heading data, there could be six buttons labeled "Back," "Forward," "Refresh," "Print," "Bill" and "Help" along with a check box to toggle advertisement highlighting on and off. Otherwise, the "Back" and "Forward" buttons would be replaced with the "Reverse Side" button 1013. The check box 1022 could be eliminated, in which case the bill could have separate links to views of the page with and without highlighting.

Figure 11:
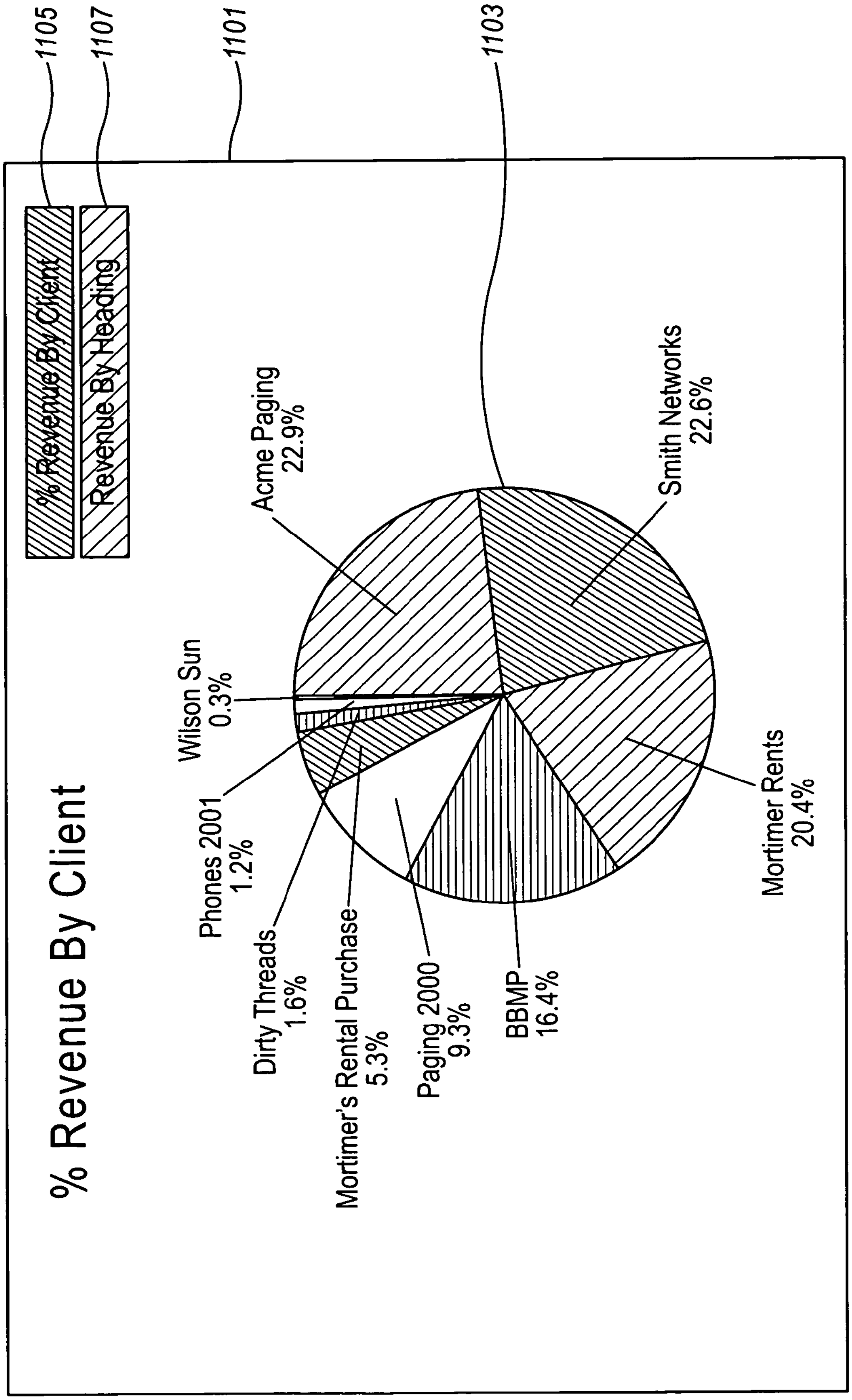
FIG. 11 shows an analysis of revenues presented by the electronic billing system.

The "Analyze Bill" button is linked to a page 1101 of graphics 1103 showing revenues, as shown in FIG. 11. The upper right corner of the page 1101 has two buttons 1105 and 1107 which allow the user to view percent revenue by client or revenue by heading.

The "Reconciliation Forms" button is linked to a reconciliation form modeled on the standard form 1080 used in the industry. The "Select a Bill" button is linked back to the page 701 shown in FIG. 7. The "Contact Us" button is linked to a page of contact information; it can alternatively have a "mailto:" link.

Figure 12A:
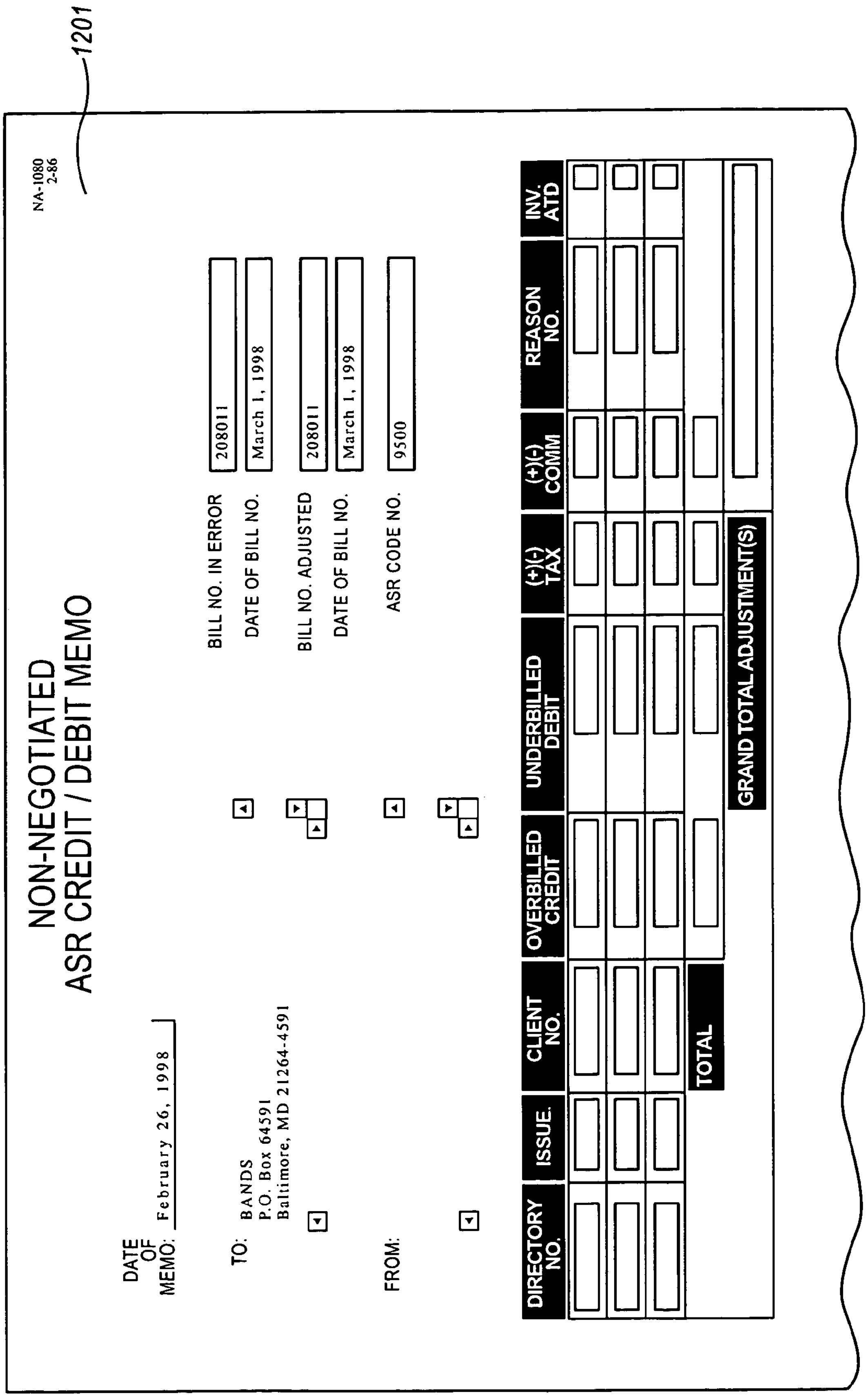
FIGS. 12A and 12B show a drawing of a reconciliation form for the electronic billing system.
Figure 12B:
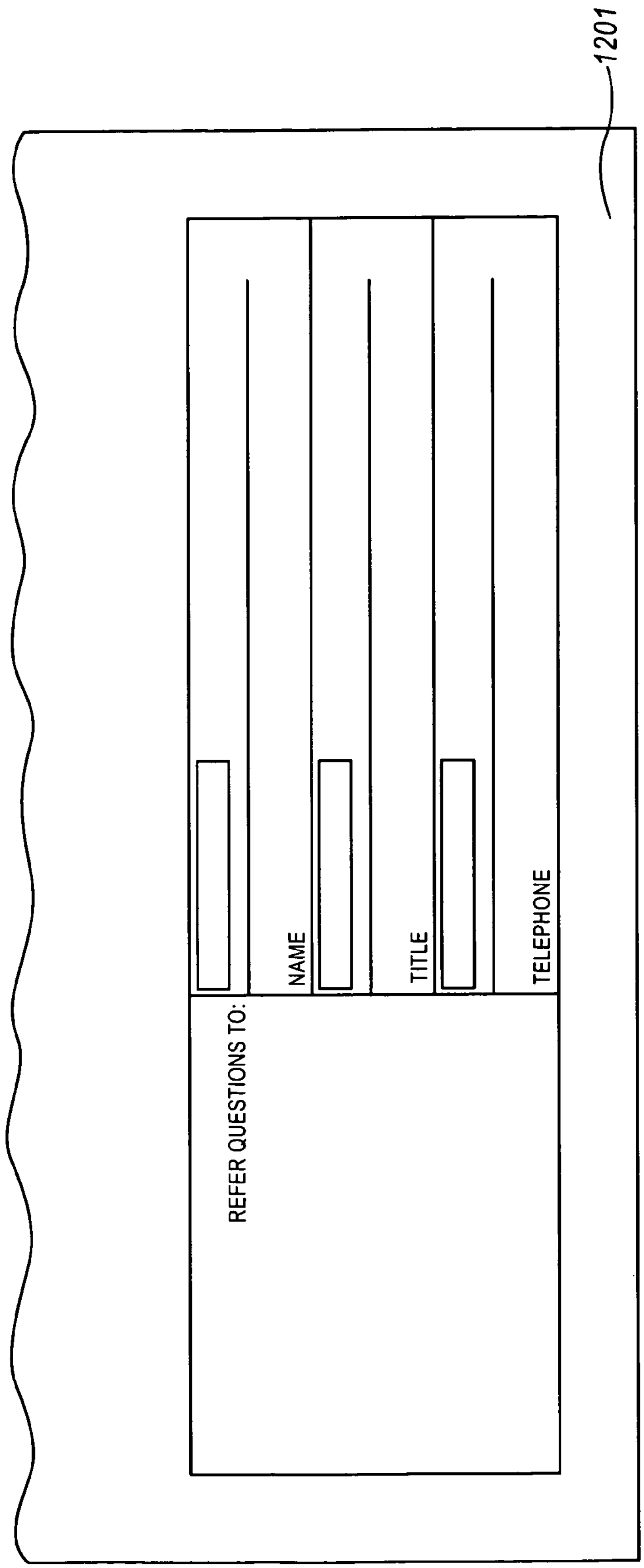

The reconciliation form will now be explained. The form is displayed in the browser in a single frame, although for the sake of clarity, FIGS. 12A and 12B show the form 1201 as split between them. The form 1201 provides JavaScript code for electronic reconciliation of accounts.

The CD-ROM on which the electronic billing system is distributed will now be described.

The root directory of the CD-ROM includes the files GO.HTM, which has beed described above, and AUTORUN.INF and README.TXT, whose purposes will be familiar from the description of the Yellow Pages viewer. The root directory also contains files in GIF and JPEG formats for various graphics used in GO.HTM.

The root directory further contains the directories BILL, BOOK, INSTALL and YPVIEWER. The BILL directory includes subdirectories for the various accounts. The other directories are organized similarly to those in the Yellow Pages viewer, except that the contents of the BOOK directory can be further organized by White Pages and Yellow Pages.

As noted above, much of the electronic billing system is implemented in HTML, either with or without JavaScript. However, the tear page viewer of FIG. 10 is implemented in Java. The Java software for implementing the tear page viewer will now be described with reference to FIGS. 13 and 14.

Figure 13:
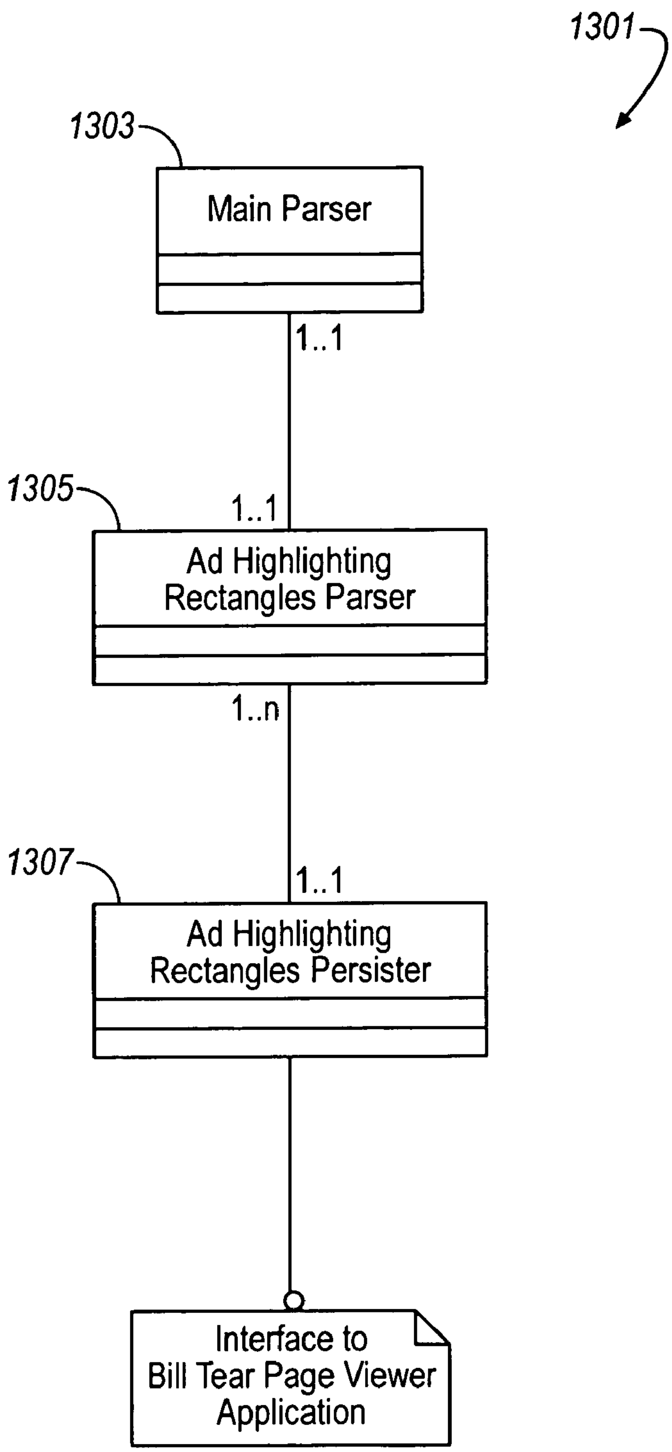
FIG. 13 shows a diagram of an application for parsing information for highlighting advertisements in the tear page viewer.

FIG. 13 shows a UML diagram of the advertisement highlighting rectangles parser 1301. The parser 1301 parses definitions of advertisement highlighting rectangles from an input format which can be text, an Oracle database, an EPS file or any other suitable format. The output is a serialized Java object which indicates a bounding rectangle framing each advertisement.

In the parser 1301, the Main Parser class 1303 provides a front end for receiving the input file format or formats. The Ad Highlighting Rectangles Parser class 1305 converts the input information into the serialized Java object. The Ad Highlighting Rectangles Persister class 1307 stores the serialized Java object and provides an interface to the tear pages viewer.

Figure 14A:
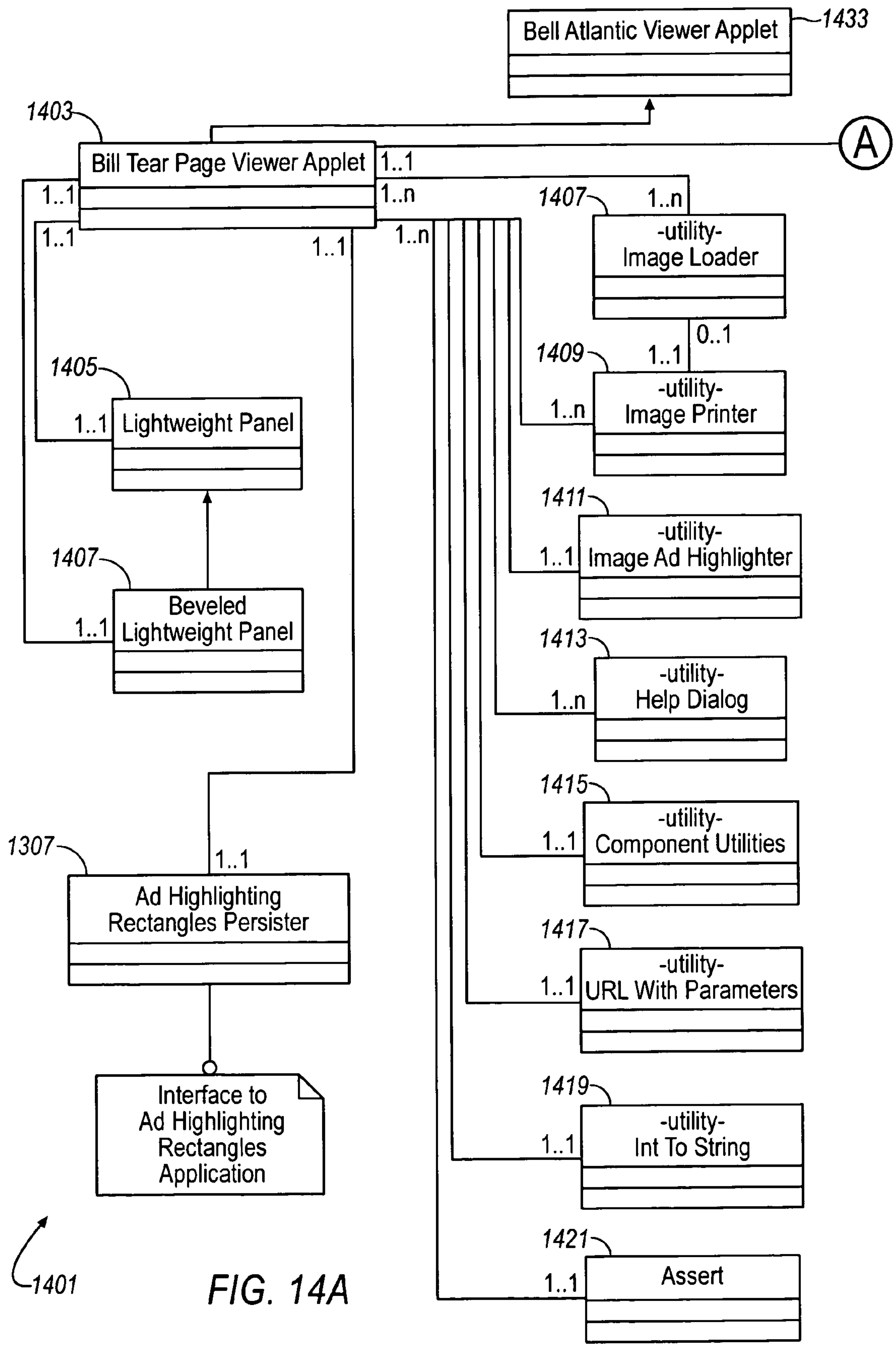
FIG. 14 shows a diagram of an application for the tear page viewer.
Figure 14B:
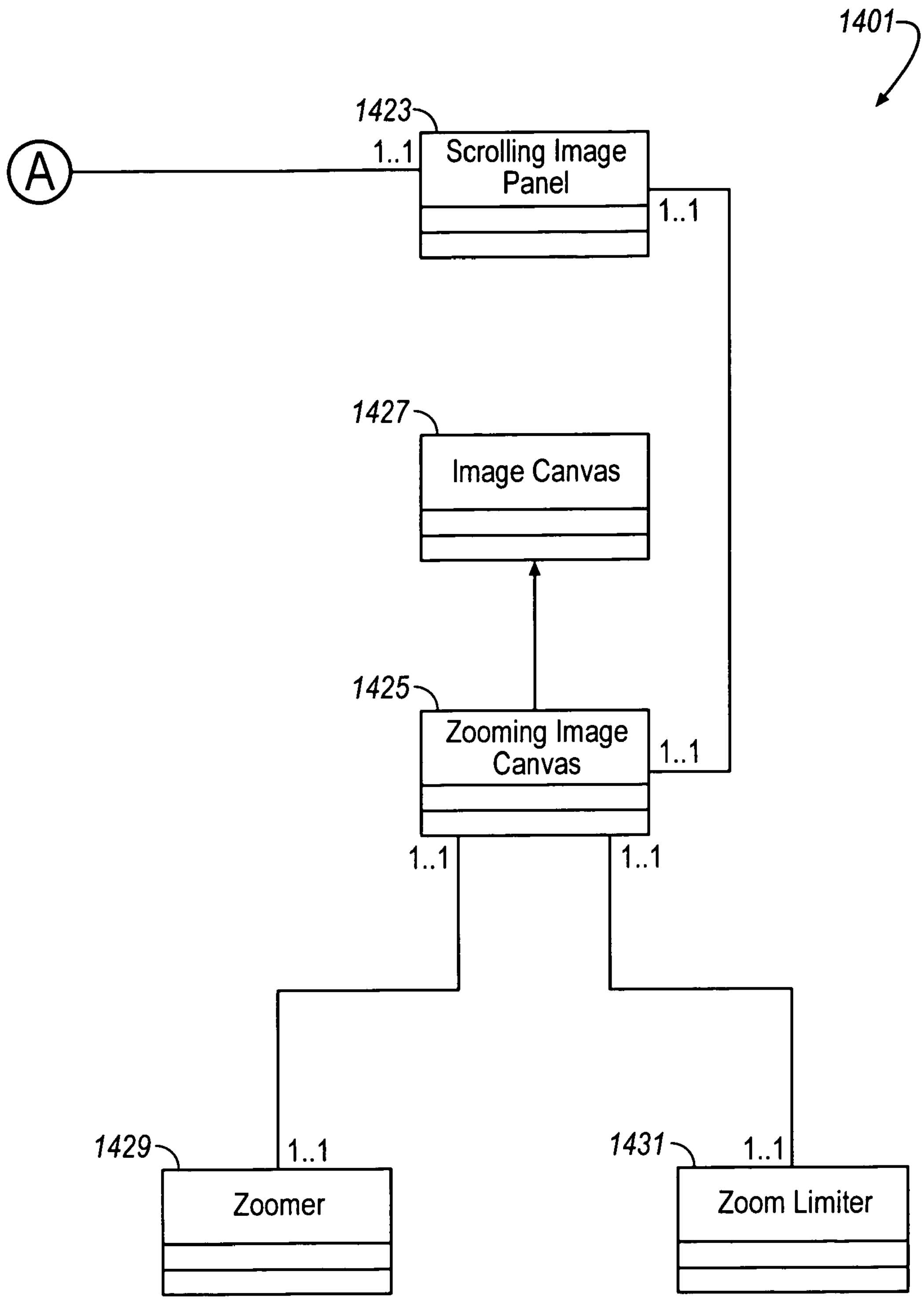

FIG. 14 shows a UML diagram of the tear pages viewer. The tear pages viewer 1401, summoned from the electronic bill as described above, provides the user with a GUI which enables the user to view a tear page image associated with the directory bill. The user can zoom in and out when viewing the tear page image. The viewer 1401 also allows back and forward navigation, printing, help and return-to-bill functions. The reverse side tear page, when provided, can be viewed. Since the viewer 1401 is loaded frequently, its applet Java archive file size should be as small as possible.

As already noted, the Ad Highlighting Rectangles Persister 1307 provides an interface between the parser 1301 and the viewer 1401. The Bill Tear Page Viewer Applet 1403 provides the functionality specific to the tear page viewer 1001 of FIG. 10. The Lighweight Panel 1405 and the Beveled Lightweight Panel 1407 are used in drawing the interface on the screen and appear, e.g., in the top bar 1011 and the bottom bar 1023, respectively. The Image Loader 1407 loads the image from the JPEG file, while the Image Printer 1409 interfaces with the printer driver of the operating system on which the billing system is run in order to print the tear page. The Image Ad Highlighter 1411 reads the rectangle information from the Ad Highlighting Rectangles Persister 1307 to draw the rectangle 1009 around the advertisement 1007 when that operation is needed. The Help Dialog 1413 displays a limited amount of help information stored in the Java archive; in future embodiments, if more detailed help is needed, a stand-alone help file can be summoned instead. Various off-the-shelf Java classes can be included, such as Component Utilities 1415, URL With Parameters 1417, IntToString (integer to string converter) 1419 and Assert (tests the truth of assertions) 1421.

The scrolling of the page 1005 is under the control of the Scrolling Image Panel 1423. The zoom ing of the page 1005 is under the control of the Zooming Image Canvas 1425, the Image Canvas 1427, the Zoomer 1429 and the Zoom Limiter 1431. A viewer Applet 1433 provides functionality common to the electronic billing system and the Yellow Pages viewer, such as identifying the page loaded and various navigation features.

The development of the applications used in the Yellow Page viewer and the electronic billing system will now be described.

Work initially began on two CD-ROM-based prototypes that each included Java tear pages viewing components. The CD-ROM Directory Bill presented a set of billing data and related tear pages, while the CD-ROM Yellow Pages Viewer presented the Chestnut Hill, Pa., Yellow Pages book (86 pages). The former prototype had a Java component that supported tear pages viewing, while the Yellow Pages Viewer was entirely written in Java. The JBuilder 1.01 IDE was used to build the Java components, and the Netscape 4.04 browser with a Java 1.1 patch was used to execute them as applets within HTML pages. The CD-ROM Yellow Pages Viewer relied upon another, stand-alone Java application called the Heading Parser. The Heading Parser took a file of ASCII Yellow Pages heading definitions and parsed that file to create a serialized Java HeadingNode object. The CD-ROM Yellow Pages Viewer deserialized that HeadingNode object when its applet started, to populate the HeadingTree widget on its GUI.

Follow-on versions of both CD-ROM prototypes were created. Versions 1.1 and 1.2 of CD-ROM Directory Bill replaced the version 1.0 bills with successively larger sets of related bills—those for The SMART Group, an Atlanta CMR which sold Yellow Pages advertising for Bell Atlantic directories. Version 1.1 of the CD-ROM Yellow Pages Viewer refined the GUI and underlying code, but retained the Chestnut Hill, Pa directory as the source of tear pages data.

Then, a significant amount of redesign and related code refactoring was done to improve the code for CD-ROM Directory Bill and CD-ROM Yellow Pages Viewer. Each application had heretofore placed most of its functionality within a single, large subclass of Applet. It was clear that factoring out common utility classes to encapsulate shared functionality would be very beneficial. Refactoring produced those utility classes, plus a superclass that became a common Applet parent for two new subclasses—one for each prototype's Applet functionality. In addition, work was done to implement printing of tear pages from both applets. Finally, for the Yellow Pages Viewer work was done to design and implement a Dialog that supported queuing of tear pages images and various operations upon the queue.

Another increment of the life cycle of the Java code began with the purchase and use of JBuilder 2. That release of Jbuilder is fully integrated with the current versions of the Swing libraries. Swing is an intermediate or bridging step between the Java 1.1 AWT and the upcoming Java 1.2 JFC—there are in fact 1.1 and 1.2 versions of the Swing library. The HeadingNode and HeadingTree classes used by the Heading Parser and Yellow Pages Viewer are JBuilder-proprietary. In JBuilder 1.01, these classes were built over the Java 1.1 AWT. In JBuilder 2, however, they are built over the Java 1.1 Swing library. The implications of this JBuilder change for Yellow Pages Viewer were that significant code changes needed to be done to make the applet run successfully. Applets that use Swing classes must extend JApplet rather than Applet, as the JApplet class is the Swing successor to the AWT Applet class. Work was done to create a version of BellAtlanticViewerApplet that extended JApplet, and to modify YellowPagesViewerApplet to be compatible with it. Because Netscape 4.05 does not include Swing (as it does the AWT), the YellowPagesViewer JAR file had to include it in order to load and run the applet. Unfortunately, because the Bill Tear Pages Viewer does not use Swing (and should not, at least currently, because of the need to keep the JAR file small), it must use another version of BellAtlanticViewerApplet that extends Applet.

The Ad Highlighting Rectangles Parser application was developed to meet a need for automated highlighting definition, and is analogous to Heading Parser in its transformation of text file input to serialized Java object output read into an applet. In that case, the Bill Tear Pages Viewer is the client applet serializing these objects. Each serialized object is a Hashtable of Hashtables, keyed by spine code and ad number at each respective level. The ad-number-keyed Hashtables at the lower level have values of Rectangles—these are the ad highlighting rectangles. The Bill Tear Pages Viewer has evolved further, as it is an active part of the Online Directory Bill. Its evolution enables a dynamically configurable GUI that supports multi-page headings when applet parameters indicate they are defined for a tear page. It is also backward compatible for tear pages that do not have multi-page headings, via the same dynamic configuration. Other GUI changes include refinements to improve scroll-bar responsiveness, display a full-page image upon applet startup and after a refresh action (renamed from reload), and allow highlighting to be toggled on and off. The code for all classes used by Bill Tear Pages Viewer has been further pruned, and documentation has been improved in quality but reduced in quantity, to minimize JAR file size. The Heading Parser and Yellow Pages Viewer applications have had minor documentation upgrades and some code streamlining. Yellow Pages Viewer has been updated to be consistent with changes in the utility classes occasioned during work on Bill Tear Pages Viewer; this mainly involved updating the JApplet-extending version of BellAtlanticViewerApplet.

Further modifications to the code are contemplated, such as refactoring some common concrete functionality up into the Viewer Applet from its subclasses. Such refactoring should be done to enhance the maintainability and extensibility of Bill Tear Pages Viewer and Yellow Pages Viewer, but to allow the two applications to move in independent directions where that makes sense. Documentation may be moved to Javadoc format. As each class and method already has its own header comment with parameter information, doing this should not be very difficult.

Also, as Web browsers evolve, the applications may be revised. In particular, as newer versions of browsers acquire more Java functionality, the applications will become less dependent on proprietary classes which must be bundled into the Java archives. Thus, the Java archives can be made smaller.

While preferred embodiments have been set forth in detail above, those skilled in the art who have reviewed the present disclosure will readily appreciate that other embodiments can be realized within the scope of the present invention. For example, the concepts described above can be expanded to cover White Pages directories, particularly business White Pages directories with display advertising, as well as government Blue Pages listings. The concepts can also be expanded to cover other kinds of documents, whether or not related to telephone listings. Directory navigation modes other than by heading and page number can be added, as can additional billing analysis tools. For example, the search capability can be expanded to include vendor address, name, telephone number or the like. In the electronic billing system, another page or pages besides the page with the subject advertisement and the reverse side can be included; for example, the page which appears opposite to the page with the advertisement when the printed directory is opened can be used to provide a view simulating that of two pages of an open book, or all of the pages under the same heading can be included. The user interface displayed by each Java archive can be modified; for example, zoom-in and zoom-out buttons can be added. The page files can be stored in any suitable format, such as GIF or Adobe PDF. Different file formats have different advantages and disadvantages; for example, GIF offers clarity and lack of noise on text segments at the expense of increased file size. Other reports besides reconciliation reports can be added. Other delivery modes can be used; for example, the electronic bill can be e-mailed from the publisher to the CMR or between any two appropriate parties. Therefore, the present invention should be construed as limited only by the appended claims and the applicable rules of law.

What is claimed is:

1. A method of providing a document in electronic form, the document having a plurality of pages, the method comprising:

(a) providing a print queue of printing data for producing the document in a printed format;

(b) converting the printing data in the print queue into a plurality of viewable files by capturing the printing data from the print queue and not by producing or scanning hard copies of the print data, each viewable file representing one of the pages of the document and preserving the printed format;

(c) providing page-heading data representing an organization of the document;

(d) parsing the page-heading data to produce an index;

(e) providing software to view the viewable files and to search through the viewable files in accordance with the index; and (f) providing the plurality of viewable files, the index and the software in persistent storage.

2. The method of claim 1, wherein:

the printing data in the print queue comprise data to be rasterized to produce the document;

step (b) comprises rasterizing the data to be rasterized; and the viewable files are bitmap files.

3. The method of claim 2, wherein the data to be rasterized comprise PostScript data.

4. The method of claim 2, wherein step (b) comprises applying compression to the bitmap files.

5. The method of claim 4, wherein the compression is a lossy compression.

6. The method of claim 1, wherein:

the document is organized under a plurality of headings; and the index associates each heading with a page on which the beading appears.

7. The method of claim 6, wherein the index associates each heading with a first page on which the heading appears.

8. The method of claim 6, wherein the software comprises software to receive a typed name of a heading and to retrieve the page associated with that heading in the index.

9. The method of claim 6, wherein the software is adapted to show a list of headings and to retrieve a page associated with a heading based on a selection of the heading from the list.

10. The method of claim 1, wherein the software is written in a device-independent language.

11. The method of claim 10, wherein the device-independent language is Java.

12. The method of claim 1, wherein the software is written to run within a World Wide Web browser.

13. A system for allowing a user to access a document in electronic form, the document having a plurality of pages, the system comprising:

(a) a persistent electronic storage medium having written thereon:

(i) a plurality of viewable files, each viewable file generated from data stored in a print queue, said each viewable file representing one of the pages of the document and preserving a printed format of said one of the pages;

(ii) an index representing an organization of the document; and (iii) software to view the viewable files and to search through the viewable files in accordance with the index;

(b) a computer for accessing the medium, running the software and allowing the user to interact with the software; and (c) a capturing device, comprising a capturer and electronic directory host, adapted to receive electronic data from a print queue and dispatch it to the persistent electronic storage medium as a viewable file.

14. The system of claim 13, wherein the viewable files are bitmap files.

15. The system of claim 14, wherein the bitmap files have a compression applied thereto.

16. The system of claim 15, wherein the compression is a lossy compression.

17. The system of claim 13, wherein:

the document is organized under a plurality of headings; and the index associates each heading with a page on which the heading appears.

18. The system of claim 17, wherein the index associates each heading with a first page on which the heading appears.

19. The system of claim 17, wherein the software comprises software to receive a typed name of a heading and to retrieve the page associated with that heading in the index.

20. The system of claim 17, wherein the software comprises software to show a list of headings, to receive a selection of a heading from the list and to retrieve the page associated with that heading in the index.

21. The system of claim 13, wherein the software is written in a device-independent language.

22. The system of claim 21, wherein the device-independent language is Java.

23. The system of claim 13, wherein:

the computer has a World Wide Web browser installed thereon; and the software is written to run within the World Wide Web browser.

24. The system of claim 13, wherein:

the medium is installed on a server of a network; and the computer is connected to the network to access the medium on the server.

25. The system of claim 24, wherein the network is a local area network.

26. The system of claim 24, wherein the network is a virtual private network.

27. The system of claim 24, wherein the network is the Internet.

28. A method of providing a page of a document in electronic form, the document having a plurality of pages with one or more items on each page, the page having a selected item thereon, the method comprising:

(a) providing page-heading data representing an organization of the document;

(b) parsing the page-heading data to determine a page on which the selected item is located and a position of the selected item on the page and to output highlighting information representing the position;

(c) providing a print queue of printing data for producing the document in a printed format;

(d) converting the printing data in the print queue into a viewable file representing the page in said printed format by capturing the printing data from the print queue and not by producing or scanning hard copies of the page to generate the viewable file;

(e) providing software to view the viewable file and to highlight the position of the selected item on the page; and (f) storing the viewable file, the highlighting information and the software on persistent storage.

29. The method of claim 28, further comprising:

(a) determining a reverse-side page corresponding to the page determined in step (b);

(b) converting the print queue into a reverse-side viewable file representing the reverse-side page; and (c) providing the reverse-side viewable file on the persistent storage; and wherein the software comprises software for selectively viewing either the viewable file or the reverse-side viewable file.

30. The method of claim 28, wherein the software comprises software for selectively viewing the viewable file either with or without the selected item highlighted.

31. The method of claim 28, wherein the software comprises software for viewing material which is associated with the selected item which does not include any text or graphics contained in the document.

32. The method of claim 31, wherein the additional material comprises a bill associated with the selected item.

33. The method of claim 31, wherein the additional material comprises a link to view the viewable file.

34. The method of claim 31, wherein the link permits selection of the viewable file with or without highlighting for the selected item.

35. The method of claim 28, wherein:

the printing data in the print queue comprise data to be rasterized to produce the document;

step (d) comprises rasterizing the data to be rasterized; and the viewable file is a bitmap file.

36. The method of claim 35, wherein the data to be rasterized comprise PostScript data.

37. The method of claim 35, wherein step (d) comprises applying compression to the bitmap file.

38. The method of claim 37, wherein the compression is a lossy compression.

39. The method of claim 28, wherein the software is written in a device-independent language.

40. The method of claim 39, wherein the device-independent language is Java.

41. The method of claim 28, wherein the software is written to run without a World Wide Web browser.

42. A system for allowing a user to access a page of a document in electronic form, the document having a plurality of pages with one or more items on each page, the page having a selected item thereon, the system comprising:

(a) a persistent electronic storage medium storing, in computer-readable form:

(i) highlighted information representing a position of the selected item on the page;

(ii) a viewable file generated from data stored in a print queue, the viewable file representing the page and preserving a printed format of the page; and (iii) software to view the viewable file and to highlight the position of the selected item on the page;

(b) a computer for accessing the medium, running the software and allowing the user to interact with the software; and (c) a capturing device, comprising a capturer and electronic directory host, adapted to receive electronic data stored in a print queue and dispatch it to the persistent electronic storage medium as a viewable file.

43. The system of claim 42, wherein:

the medium further has stored thereon a reverse-side viewable file representing a reverse-side page corresponding to the page; and the software comprises software for selectively viewing either the viewable file or the reverse-side viewable file.

44. The system of claim 42, wherein the software comprises software for viewing the viewable file either with or without the selected item highlighted.

45. The system of claim 42, wherein the software comprises software for viewing material which is associated with the selected item which does not include any text or graphics contained in the document.

46. The system of claim 45, wherein the additional material comprises a bill associated with the selected item.

47. The system of claim 45, wherein the additional material comprises a link to view the viewable file.

48. The system of claim 47, wherein the link permits selection of the viewable file with or without highlighting for the selected item.

49. The system of claim 42, wherein the viewable file is a bitmap file.

50. The system of claim 49, wherein the bitmap file has compression applied thereto.

51. The system of claim 50, wherein the compression is a lossy compression.

52. The system of claim 42, wherein the software is written in a device-independent language.

53. The system of claim 52, wherein the device-independent language is Java.

54. The system of claim 42, wherein:

the computer has a World Wide Web browser installed thereon; and the software is written to run within the World Wide Web browser.

55. The system of claim 42, wherein:

the medium is installed on a server of a network; and the computer is connected to the network to access the medium on the server.

56. The system of claim 55, wherein the network is a local area network.

57. The system of claim 55, wherein the network is a virtual private network.

58. The system of claim 55, wherein the network is the Internet.

* * * * *